United States Patent
Kato et al.

[11] Patent Number: 6,017,503
[45] Date of Patent: Jan. 25, 2000

[54] METHOD OF REMOVING NO$_x$ FROM EXHAUST GASES

[75] Inventors: Nobuhide Kato, Ama-gun; Hiroshi Kurachi, Nagoya, both of Japan

[73] Assignee: NGK Insulators, Ltd., Japan

[21] Appl. No.: 08/889,507

[22] Filed: Jul. 8, 1997

[30] Foreign Application Priority Data

Jul. 25, 1996 [JP] Japan .................................. 8-196319

[51] Int. Cl.$^7$ .......................... B01D 53/56; B01D 53/30; B01D 53/92; B01D 53/94
[52] U.S. Cl. ................ 423/235; 423/212 R; 423/212 C; 423/213.2; 423/239.1; 423/DIG. 5; 422/110; 364/528.06
[58] Field of Search ................................ 423/212, 213.2, 423/235, 239.1, DIG. 5, 212 C, 212 R; 422/110; 436/116, 117; 364/528.06

[56] References Cited

U.S. PATENT DOCUMENTS

| | | | |
|---|---|---|---|
| 5,021,227 | 6/1991 | Kobayashi et al. | 423/212 |
| 5,540,047 | 7/1996 | Dahlheim et al. | 60/274 |
| 5,785,937 | 7/1998 | Neufert | 423/213.2 |

FOREIGN PATENT DOCUMENTS

| | | | |
|---|---|---|---|
| 0 239 106 A2 | 9/1987 | European Pat. Off. | 423/239.1 |
| 0 239 106 A3 | 9/1987 | European Pat. Off. . | |
| 0 257 842 A2 | 3/1988 | European Pat. Off. . | |
| 0 257 842 A3 | 3/1988 | European Pat. Off. . | |
| 0 263 183 A1 | 4/1988 | European Pat. Off. . | |
| 0 496 096 A1 | 7/1992 | European Pat. Off. | 423/239.1 |
| 0 554 766 A1 | 8/1993 | European Pat. Off. | 423/239.1 |
| 0 653 237 A1 | 5/1995 | European Pat. Off. . | |
| 0 678 740 A1 | 10/1995 | European Pat. Off. . | |
| 0 731 351 A2 | 9/1996 | European Pat. Off. . | |
| 0 731 351 A3 | 4/1997 | European Pat. Off. . | |
| 36 06 535 A1 | 9/1987 | Germany . | |
| 54-5863 | 1/1979 | Japan | 423/235 |
| 61-242622 | 10/1986 | Japan | 423/213.2 |
| 64-83816 | 3/1989 | Japan . | |
| 2-63524 | 3/1990 | Japan | 423/239.1 |
| 4-16215 | 1/1992 | Japan | 422/110 |
| 4-358716 | 12/1992 | Japan . | |
| 5-113116 | 5/1993 | Japan . | |
| 58-143825 | 8/1993 | Japan | 423/235 |
| 7-127503 | 5/1995 | Japan . | |
| WO 94/15206 | 7/1994 | WIPO . | |

OTHER PUBLICATIONS

Patent Abstracts of Japan; vol. 097, No. 006, Jun. 30, 1997 for JP 09 033512 A (NGK Insulators Ltd), Feb. 7, 1997, abstract.

*Primary Examiner*—Gary P. Straub
*Assistant Examiner*—Timothy C Vanoy
*Attorney, Agent, or Firm*—Parkhurst & Wendel, L.L.P.

[57] ABSTRACT

A method for removing nitrogen oxides out of the exhaust gas from a combustion apparatus is provided by reducing the nitrogen oxides with injected ammonia or urea to produce nitrogen and water. The method further includes the provision of at least one, sensor placed downstream from the nitrogen oxides removal step for measuring the concentration of the residual ammonia and nitrogen oxides in the exhaust gas after the nitrogen oxides removal step. The method also further includes the provision of a controller for controlling the rate that the ammonia and/or urea is injected into the exhaust gas so that the rate of ammonia and/or urea injection is repeatedly increased and decreased in response to the signal generated by the sensor about a reference value plus the average of the increased and reduced rates of ammonia and urea injection.

11 Claims, 23 Drawing Sheets

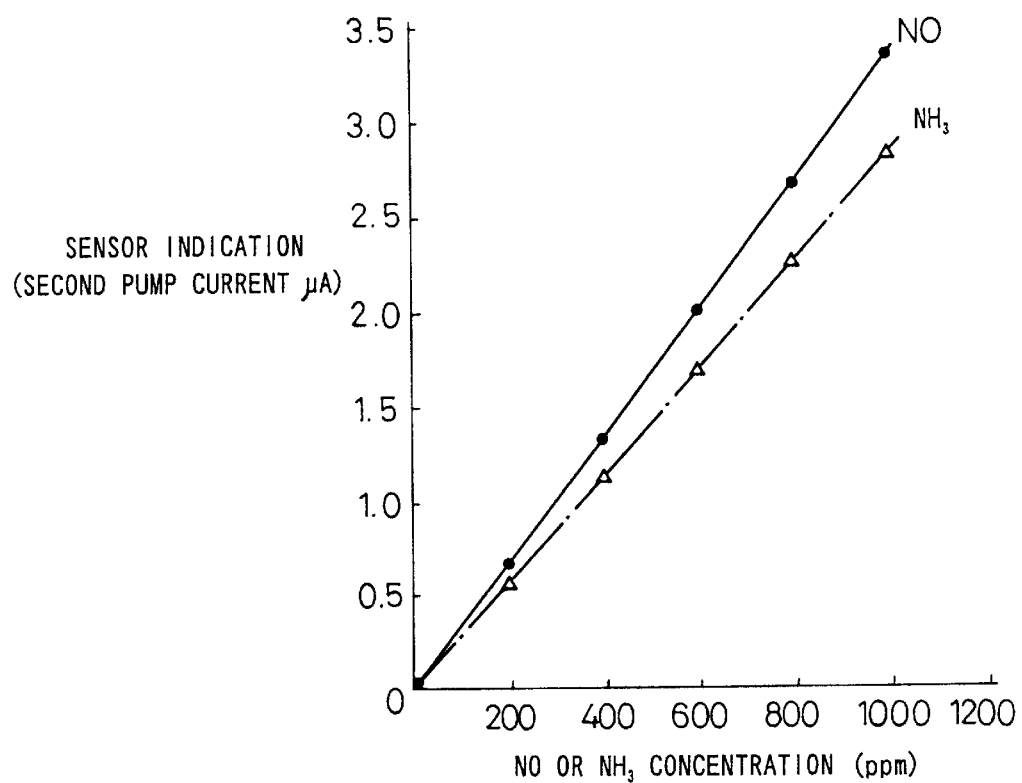

F I G. 22
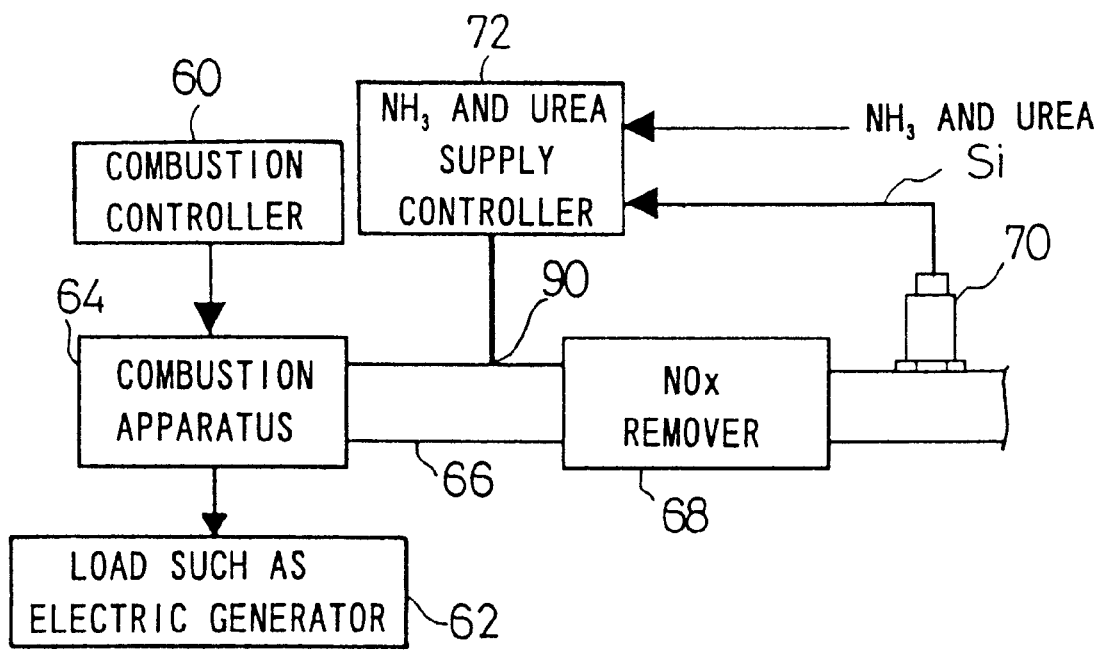

PRIOR ART

METHOD OF REMOVING NO$_X$ FROM EXHAUST GASES

BACKGROUND OF THE INVENTION

1. Field of the Invention

The present invention relates to a system for and a method of removing NOx from exhaust gases emitted from a combustion apparatus such as an internal combustion engine or the like by reacting NOx with NH$_3$ to produce N$_2$ and H$_2$O.

2. Description of the Related Art

As shown in FIG. 23 of the accompanying drawings, one general NOx removal system for removing NOx from exhaust gases includes an NOx remover 202, which comprises a catalytic converter, for reacting NOx emitted from a combustion apparatus 200 such as an internal combustion engine or the like with NH$_3$ to produce N$_2$ and H$_2$O. The NOx removal system also has an NH$_3$ supply controller 208 for introducing NH$_3$ at a preset rate depending on a load 204 on the combustion apparatus 200 or an output power thereof into a gas passage 206 from the combustion apparatus 200, and an NOx analyzer 210 connected to a discharge passage of the NOx remover 202 through a sampling line L. The NOx analyzer 210 determines the difference between the concentration of NOx in exhaust gases emitted from the NOx remover 202 and a predetermined reference concentration, and the NH$_3$ supply controller 208 controls the rate of NH$_3$ introduced into the gas passage 206 based on the determined difference. For details, reference should be made to Japanese laid-open patent publication No. 64-83816.

According to other conventional NOx removal processes, the concentration of NOx in exhaust gases emitted from the combustion apparatus 200 is sampled upstream of the NOx remover 202, and NH$_3$ is introduced upstream of remover 202 based on the sampled concentration of NOx, or combustion apparatus 200 is measured downstream of the NOx remover 202 for the control of rate of NH$_3$ to be introduced. The NOx removal system shown in FIG. 23 is more advantageous than those conventional NOx removal processes in that since the concentration of NOx is sampled downstream of the NOx remover 202, the NOx removal system requires no precision measuring instrument, and any discharge of NH$_3$ from the NOx remover 202 is minimized.

However, the NOx removal system shown in FIG. 23 suffers the following problems:

While the concentration of NOx in emitted exhaust gases is sampled by the NOx analyzer 210, NH$_3$ contained in the emitted exhaust gases is not measured. Therefore, an excessive introduction of NH$_3$ cannot be detected, and may be discharged into the atmosphere.

Therefore, the NOx removal system shown in FIG. 23 is premised not to increase the rate of NH$_3$ to be introduced when the concentration of NOx in the emitted exhaust gases is lower than a certain value, e.g., 80% of a reference value according to the air pollution regulations. If the rate of NH$_3$ to be introduced were increased to further reduce the concentration of NOx in the emitted exhaust gases, then an increased amount of NH$_3$ would be discharged into the atmosphere.

The NOx removal system shown in FIG. 23 may not necessarily minimize the amount of both NOx and NH$_3$ discharged into the atmosphere.

Another drawback of the NOx removal system is that when the purifying efficiency of the NOx remover 202 is lowered to the point where the amount of emitted NOx exceeds a predetermined level, the rate of introduced NH$_3$ is automatically increased even though it is already sufficient, and hence the amount of NH$_3$ emitted into the atmosphere is increased.

The above drawback may be eliminated if an NH$_3$ analyzer is added downstream the NOx remover 202 for monitoring emitted NH$_3$ so that the NH$_3$ supply controller 208 controls the rate of introduced NH$_3$ in a manner to keep the concentration of NH$_3$ at a low level and lower the amount of emitted NOx. However, adding the NH$_3$ analyzer will increase the size of the NOx removal system and require the NH$_3$ supply controller 208 to have a more complex control circuit. Even if two analyzers, i.e., an NOx anaLyzer and an NH$_3$ analyzer, are added, since they usually have difference responses, it is difficult for the NH$_3$ supply controller 208 to control the NOx and NH$_3$ concentrations highly accurately.

NOx analyzers are usually CLD or NDIR analyzers that are highly expensive and have slow responses which do not allow the rate of introduced NH$_3$ to be highly accurately controlled.

Another conventional NOx removal system has an NOx catalyst and an oxidizing catalyst which are disposed in the exhaust system of a diesel engine, and an apparatus for introducing urea into the exhaust system upstream of the NOx catalyst. The introduced urea produces NH$_3$ in the NOx catalyst.

In this NOx removal system, the rate of urea to be introduced is controlled according to mapping information (representative of the relationship between engine operating conditions and NOx concentrations) of NOx which is stored in a microprocessor, and the temperature of the NOx catalyst. However, the NOx concentration or the amount of NOx determined from the mapping information may deviate from an actually emitted amount, with the result the NOx removal system may fail to remove NOx efficiently from the exhaust gases, and the introduced urea or NH$_3$ decomposed therefrom may be emitted from the exhaust system.

Japanese laid-open patent publications Nos. 4-358716 and 7-127503 disclose NOx removal systems in which HC is introduced instead of NH$_3$, an NOx sensor is attached downstream of an NOx catalyst, and the rate of HC to be introduced is controlled by a signal from the NOx sensor.

These systems have a poor NOx reduction efficiency because HC is used as a reducing agent. Even if an efficient catalyst temperature range is selected, the NOx reduction efficiency ranges from 40% to 60% at most, and almost half of the introduced amount of HC is discharged. Furthermore, the efficient catalyst temperature range is very limited, i.e., it is 400° C.±50° C. Consequently, these systems may possibly frequently cause HC to be discharged beyond its emission control level in applications where the temperature of exhaust systems vary widely, e.g., automobile engines. To avoid such a possibility, it is necessary to add catalyst cooling and heating devices to the system.

Japanese laid-open patent publication No. 5-113116 reveals a system similar to the above systems except that a basic HC rate determined in advance depending engine operating conditions is corrected on the basis of a signal from the NOx sensor. This system, however, also suffer the above shortcomings.

SUMMARY OF THE INVENTION

It is therefore an object of the present invention to provide a system for and a method of removing NOx from exhaust gases emitted from a combustion apparatus by accurately controlling the rate of a reducing agent such as NH$_3$ and/or urea to be introduced through a simple arrangement and minimizing the emission of $NH_3$ and NOx.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 3 is a diagram showing the sensitivities to NO (a main constituent of NOx) and $NH_3$ of the NOx sensors for use in the NOx removal systems according to the first, second, and third embodiments of the present invention;

FIG. 22 is a block diagram of the NOx removal system according to still another embodiment of the present invention.

DETAILED DESCRIPTION OF THE PREFERRED EMBODIMENTS

NOx removal systems according to first, second, and third embodiments of the present invention which remove NOx from exhaust gases emitted from a combustion apparatus such as an internal combustion engine or the like, which applies energy to a load such as an electric generator or the like based on predetermined combustion control, by reacting NOx with $NH_3$ to produce $N_2$ and $H_2O$, will be described below with reference to FIGS. 1 through 22.

Prior to the description of the NOx removal systems according to first, second, and third embodiments themselves, NOx sensors for use in those removal systems will first be described below with reference to FIGS. 1 through 3.

Figure 1:
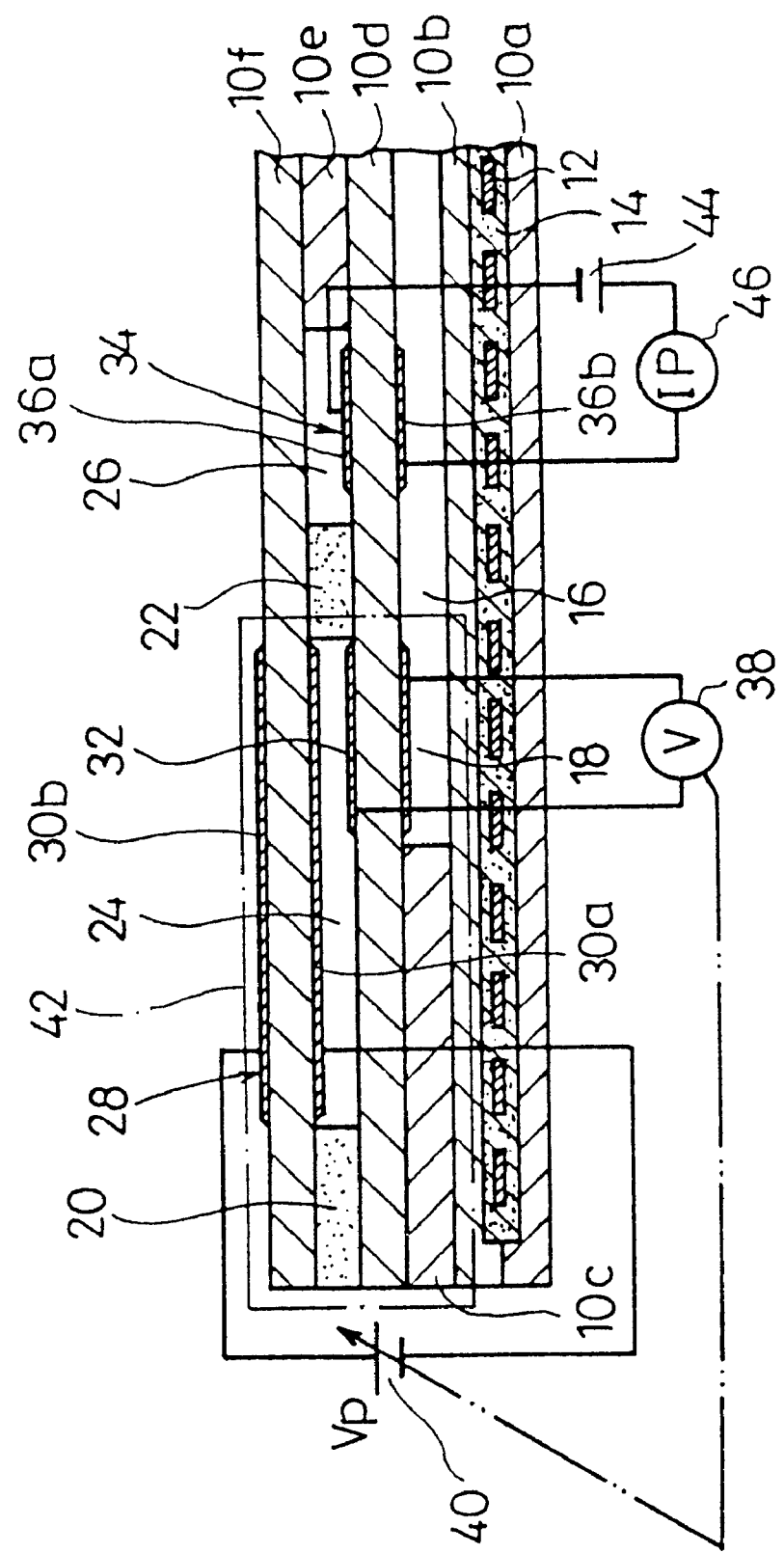
FIG. 1 is a fragmentary cross-sectional view of an NOx sensor for use in NOx removal systems according to first, second, and third embodiments of the present invention which remove NOx from exhaust gases emitted from a combustion apparatus such as an internal combustion engine or the like, which applies energy to a load such as an electric generator or the like based on predetermined combustion control, by reacting NOx with $NH_3$ to produce $N_2$ and $H_2O$.
Figure 2A:
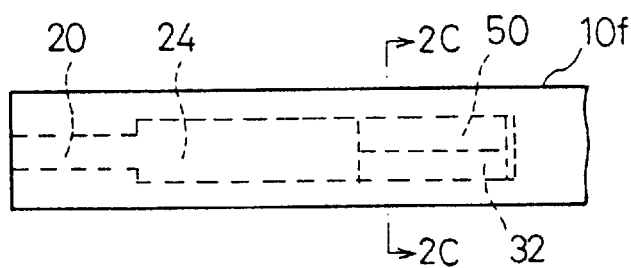
FIG. 2A is a plan view of another NOx sensor for use in the NOx removal systems according to the first, second, and third embodiments of the present invention.
Figure 2B:
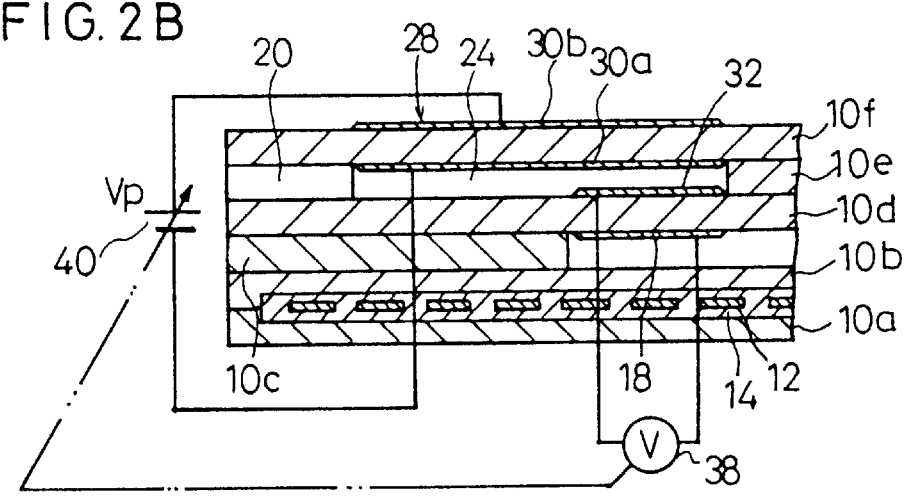
FIG. 2B is a longitudinal cross-sectional view of the NOx sensor shown in FIG. 2A.
Figure 2C:
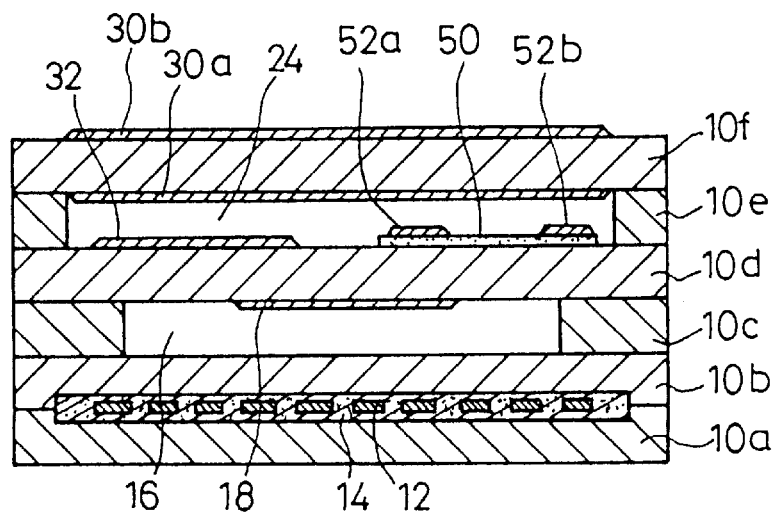
FIG. 2C is a transverse cross-sectional view taken along line 2C—2C of FIG. 2A.

NOx sensors for use in the removal systems according to the present invention may include a pumping NOx sensor comprising an oxygen pump as shown in FIG. 1 or a combination of an oxygen pump and an NOx-sensitive semiconductor as shown in FIGS. 2A through 2C.

The NOx sensor shown in FIG. 1 has a laminated structure comprising a plurality of, e.g., six, solid electrolytic layers $10a$~$10f$ of ceramics each made of an oxygen ion conductive solid electrolytic material such as zirconium oxide ($ZrO_2$) or the like. These solid electrolytic layers $10a$~$10f$ include first and second layers, as counted from below, as first and second substrate layers $10a$, $10b$, third and fifth layers as first and second spacer layers 10c, 10e, and fourth and sixth layers as first and second solid electrolytic layers 10d, 10f.

Specifically, the first spacer layer 10c is disposed on the second substrate layer 10b, and the first solid electrolytic layer 10d, the second spacer layer 10e, and the second solid electrolytic layer 10f are successively disposed on the first spacer layer 10c. A heater 12 for increasing the conductivity of oxygen ions is embedded in an insulating film 14 that is interposed between the first and second substrate layers 10a, 10b. Between the second substrate layer 10b and the first solid electrolytic layer 10d, there is defined a reference gas introduction space 16 for introducing a reference gas, e.g., air, thereinto, by a lower surface of the first solid electrolytic layer 10d, an upper surface of the second substrate layer 10b, and a side surface of the first spacer layer 10c. A reference electrode 18 for measuring a partial pressure of oxygen of a gas to be measured is mounted on the lower surface of the first solid electrolytic layer 10d which defines the reference gas introduction space 16.

The second spacer 10e is interposed between the first and second solid electrolytic layers 10d, 10f. The NOx sensor also includes first and second diffusion rate controllers 20, 22 interposed between the first and second solid electrolytic layers 10d, 10f.

A first chamber 24 for adjusting the partial pressure of oxygen of the gas to be measured is defined between a lower surface of the second solid electrolytic layer 10f, side surfaces of the first and second diffusion rate controllers 20, 22, and an upper surface of the first solid electrolytic layer 10d. A second chamber 26 for measuring NOx is defined between a lower surface of the second solid electrolytic layer 10f, side surfaces of the second diffusion rate controller 22 and the second spacer layer 10e, and an upper surface of the first solid electrolytic layer 10d. The first and second chambers 24, 26 communicate with each other through the second diffusion rate controller 22.

An electrode (inner pump electrode) 30a which serves as part of a first oxygen pump 28 (described later on) is mounted on the lower surface of the second solid electrolytic layer 10f which defines the first chamber 24. Another electrode (outer pump electrode) 30b which also serves as part of the first oxygen pump 28 is mounted on an upper surface of the second solid electrolytic layer 10f. A measuring electrode 32 is mounted on the upper surface of the first solid electrolytic layer 10d which defines the first chamber 24.

An electrode (upper pump electrode) 36a which serves as part of a second oxygen pump 34 (described later on) is mounted on the upper surface of the first solid electrolytic layer 10d which defines the second chamber 26. Another electrode (lower pump electrode) 36b which also serves as part of the second oxygen pump 34 is mounted on the lower surface of the first solid electrolytic layer 10d which defines the reference gas introduction space 16, at a location remote from the reference electrode 18.

The first and second diffusion rate controllers 20, 22 apply a predetermined diffusion resistance to the gas to be measured which is to be introduced into the first and second chambers 24, 26. For example, each of the first and second diffusion rate controllers 20, 22 may comprise a porous material through which the gas to be measured can be introduced or a passage having small pores having a predetermined cross-sectional area.

A pump voltage Vp based on a potential detected by a potentiometer 38 is applied between the inner and outer pump electrodes 30a, 30b of the oxygen pump 28 by a variable-voltage power supply 40. When the pump voltage Vp is applied, the oxygen pump 28 pumps oxygen into or out of the first chamber 24 to set a partial pressure of oxygen to a given level in the first chamber 24. The NOx sensor thus has an oxygen concentration controller 42 which is made up of the first chamber 24, the oxygen pump 28, the reference electrode 18, the measuring electrode 32, and the reference gas introduction space 16. Nitrogen oxides (NOx) are essentially measured in the second chamber 26.

Principles of a measuring process of the NOx sensor will briefly be described below. The pump voltage Vp is applied to the oxygen pump 28 to adjust an oxygen concentration in the first chamber 24 to a level low enough not to decompose NO, e.g., to a concentration as measured by its partial pressure of $10^{-7}$ atm. To further prevent NO from being decomposed at an oxygen concentration of $10^{-7}$ atm, the inner pump electrode 30a and the measuring electrode 32 are made of a material having a low NO reducing capability, e.g., an alloy of gold (Au) and platinum (Pt).

The oxygen concentration in the first chamber 24 is detected on the basis of a voltage detected by the potentiometer 38 between the measuring electrode 32 and the reference electrode 18. The pump voltage Vp is controlled and applied to the oxygen pump 28 such that the voltage detected by the potentiometer 38 will approach a reference voltage, i.e., the oxygen concentration in the first chamber 24 will be reduced to a substantially zero level.

In this manner, nitrogen monoxide (NO) remains in the first chamber 24, and flows through the second diffusion rate controller 22 into the second chamber 26. In the second chamber 26, the introduced NO is decomposed into nitrogen (N) and oxide (O). The concentration of oxygen is then measured to determine the concentration of the introduced NO indirectly. For decomposing the introduced NO, the upper pump electrode 36a is made of a material having an NOx reducing capability such as rhodium (Rh), platinum (Pt), or the like.

The concentration of oxygen in the second chamber 26 is measured by measuring a current flowing between the upper and lower pump electrodes 36a, 36b. Specifically, a pump power supply 44 is electrically connected between the lower pump electrode 36b and the upper pump electrode 36a in a direction to pump oxygen from the second chamber 26. If there is no oxygen in the second chamber 26, then since no oxygen is moved or pumped between the upper and lower pump electrodes 36a, 36b, no current flows between the upper and lower pump electrodes 36a, 36b. If there is oxygen in the second chamber 26, then the oxygen is pumped, causing a current to flow between the upper and lower pump electrodes 36a, 36b. Therefore, the concentration of oxygen in the second chamber 26 can be measured by measuring a current flowing between the upper and lower pump electrodes 36a, 36b with an ammeter 46 connected in series with the pump power supply 44. Since the measured current is proportional to the amount of oxygen pumped out of the second chamber 26, it is possible to determine the amount of NO from the measured current. This is equivalent to measuring NOx.

The NOx sensor shown in FIGS. 2A through 2C has substantially the same structure as the NOx sensor shown in FIG. 1 except that it does not have the second diffusion rate controller 22 and the second chamber 26. Those parts of the NOx sensor shown in FIGS. 2A through 2C which are identical to those of the NOx sensor shown in FIG. 1 are denoted by identical reference numerals and representations and will not be described in detail below. The NOx sensor shown in FIGS. 2A through 2C includes a diffusion rate controller 20 corresponding to the first diffusion rate controller 20 shown in FIG. 1 and a measuring chamber 24 corresponding to the first chamber 24 shown in FIG. 1.

As shown in FIG. 2C, an NOx-sensitive semiconductor (or NOx-sensitive oxide semiconductor) 50 is mounted on the upper surface of the first solid electrolytic layer 10d which defines the measuring chamber 24. The NOx-sensitive semiconductor 50 is positioned behind the measuring electrode 32 as viewed in FIG. 2B and lies parallel to the measuring electrode 32. A pair of electrodes 52a, 52b for measuring the electric resistance of the NOx-sensitive semiconductor 50 is disposed on the NOx-sensitive semiconductor 50 at respective opposite ends thereof. The electric resistance of NOx-sensitive semiconductor 50 varies when it is exposed to an atmosphere or flow of any of various gases.

When a certain sense current flows between the electrodes 52a, 52b, a voltage signal representative of the concentration of a certain gas contained in the atmosphere in the measuring chamber 24 can be extracted from the electrodes 52a, 52b.

FIG. 3 shows the sensitivities to NO (a main constituent of NOx) and $NH_3$ of the NOx sensor shown in FIG. 1. The sensitivity of the NOx sensor to $NH_3$ is substantially equal to the sensitivity of the NOx sensor to NO.

This is because a chemical reaction, indicated below, takes place in the first chamber 24, generating NO in an amount equivalent to $NH_3$. Since $NH_3$ has a diffusion coefficient smaller than NO, however, $NH_3$ is less liable to enter the first chamber 24 than NO. Therefore, the sensitivity of the NOx sensor to $NH_3$ is slightly smaller than the sensitivity of the NOx sensor to NO. The NOx sensor shown in FIGS. 2A through 2C has substantially the same sensitivity characteristics as the NOx sensor shown in FIG. 1.

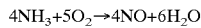

$$4NH_3 + 5O_2 \rightarrow 4NO + 6H_2O$$

The NOx removal systems according to the first, second, and third embodiments of the present invention employ the $NH_3$ sensitivity characteristics of the above NOx sensor.

If the correcting process as disclosed in Japanese laid-open patent publications Nos. 64-83816 and 5-113116 were carried out on the NOx removal system according to the present invention with the NOx sensor positioned downstream of a catalyst which employs a reducing agent of $NH_3$ or urea, then since the NOx sensor is sensitive to $NH_3$ emitted from the catalyst and produces a signal based on detected $NH_3$, the NOx removal system would interpret the signal as an emission of NOx, and increase the rate of $NH_3$ to be supplied to the catalyst. The present invention is directed to an improvement to eliminate such a drawback.

Figure 4:
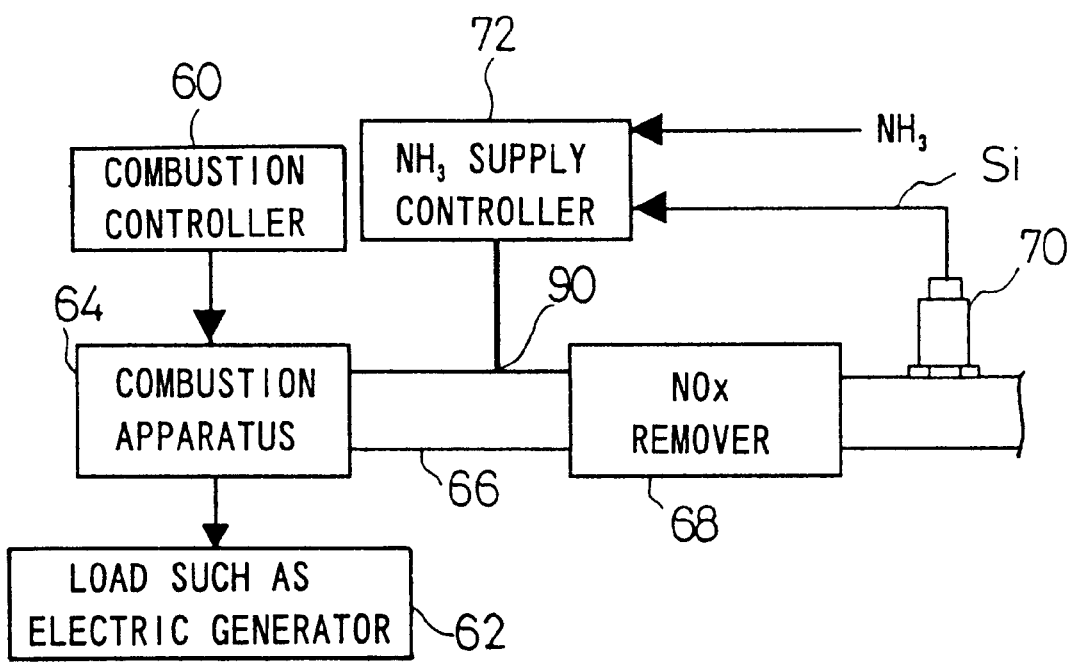
FIG. 4 is a block diagram of the NOx removal system according to the first embodiment of the present invention.

According to the first embodiment of the present invention, as shown in FIG. 4, the NOx removal system includes an NOx remover 68 for removing NOx from exhaust gases emitted through an exhaust pipe 66 from a combustion apparatus 64 such as an internal combustion engine or the like, which applies energy to a load 62 such as an electric generator or the like based on a predetermined combustion control process carried out by a combustion controller 60, by reacting NOx with $NH_3$ to produce $N_2$ and $H_2O$, the NOx removal system also having an NOx sensor 70 connected downstream of the NOx remover 68, and an $NH_3$ supply controller 72 for controlling the rate of $NH_3$ to be introduced based on a detected signal Si from the NOx sensor 70. The $NH_3$ supply controller 72 controls the rate of $NH_3$ to be introduced into the exhaust pipe 66 from an inlet 90 by increasing or reducing the rate of $NH_3$ with respect to a preset basic rate determined in advance depending on operating conditions of the combustion apparatus 64.

If the NOx sensor 70 comprises the pumping NOx sensor of $ZrO_2$ as shown in FIG. 1, then since $NH_3$ and oxygen react with each other in the first chamber 24 to produce NO, which is decomposed into $N_2$ and $O_2$ in the second chamber 26, and the generated $O_2$ is measured, the NOx sensor 70 is sensitive to $NH_3$.

The NOx sensor 70 may alternatively comprise the NOx sensor shown in FIGS. 2A through 2C. The NOx-sensitive semiconductor 50, which is dependent on oxygen, is combined with the oxygen pump 28, i.e., positioned in the measuring chamber 24 (oxygen concentration control space) in which the concentration of oxygen is controlled at a constant level by the oxygen pump 28. Since $NH_3$ reacts with oxygen in the oxygen concentration control space (the measuring chamber 24), producing NO, the NOx sensor 70 is also sensitive to $NH_3$.

Figure 5:
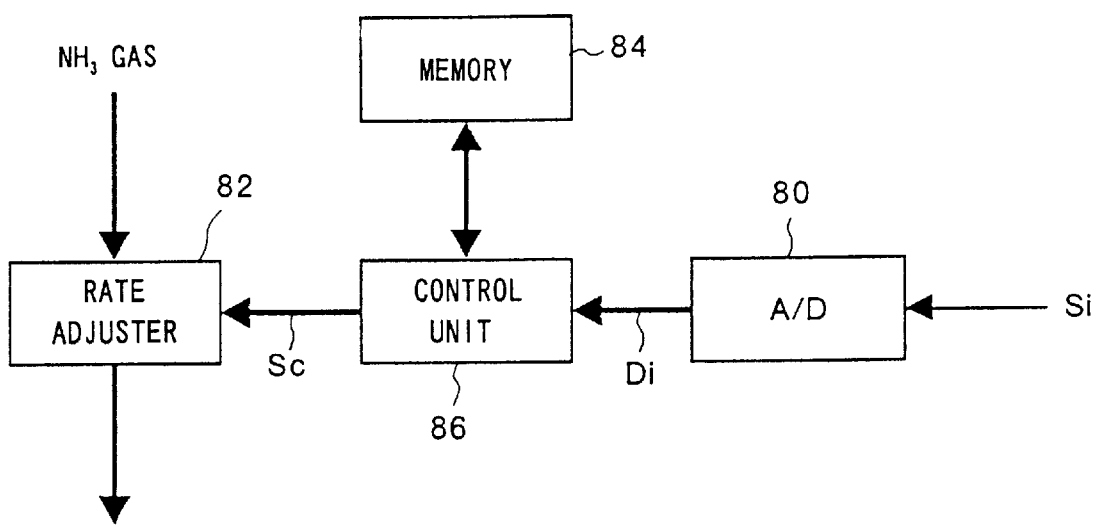
FIG. 5 is a block diagram of an $NH_3$ supply controller of the NOx removal system according to the first embodiment of the present invention.

As shown in FIG. 5, the $NH_3$ supply controller 72 comprises an analog-to-digital (A/D) converter 80 for converting the detected signal Si from the NOx sensor 70 into digital detected data Di, a rate adjuster 82 for adjusting the rate of an $NH_3$ gas to be introduced from an external $NH_3$ pump (not shown) into the exhaust pipe 66 (see FIG. 4), a memory 84 for storing various data and program data, and a control unit 86 for applying a control signal Sc to the rate adjuster 82 to increase or reduce the rate of an $NH_3$ gas to be introduced when the value of the digital detected data Di (which may also be referred to as a "data value Di") from the A/D converter 80 switches from a reducing tendency to an increasing tendency. The rate adjuster 82 may comprise a solenoid-operated value, and the control signal Sc may be a signal for controlling the time in which the solenoid-operated value is opened or closed.

The control unit 86 comprises a microcomputer, for example, and runs a sequence control program loaded from a program ROM (not shown) into the memory 84, which serves as a working RAM, to carry out a control process, which will be described below with reference to FIGS. 6 through 9.

The control process will first be described below with reference to FIGS. 6 and 7. While NOx in exhaust; gases emitted from the combustion apparatus 64 is being reduced by an $NH_3$ gas introduced from the $NH_3$ supply controller 72, NOx present in gases discharged from the NOx remover 68 is gradually reduced, and hence the data value Di of the detected signal Si produced by the NOx sensor 70 is also gradually lowered. When the data value Di changes from a reducing tendency to an increasing tendency at a point B (see FIGS. 6 and 7), the control unit 86 (see FIG. 5) generates a control signal Sc for reducing the rate of the $NH_3$ gas introduced from the $NH_3$ supply controller 72. The rate adjuster 82 now gradually reduces the rate of the $NH_3$ gas introduced into the exhaust pipe 66. From this stage on, the NOx sensor 70 is sensitive to $NH_3$ supplied thereto and produces an output signal whose waveform varies as the supplied $NH_3$ varies.

Figure 6:
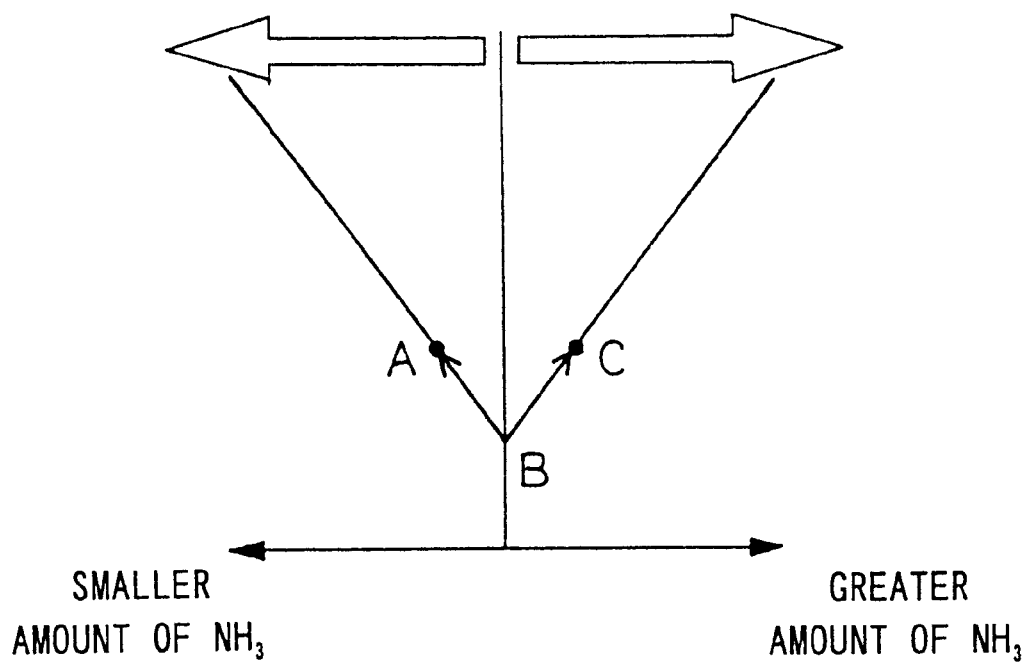
FIG. 6 is diagram illustrative of principles of a process of controlling the rate of $NH_3$ to be introduced in the NOx removal system according to the first embodiment of the present invention.
Figure 7:
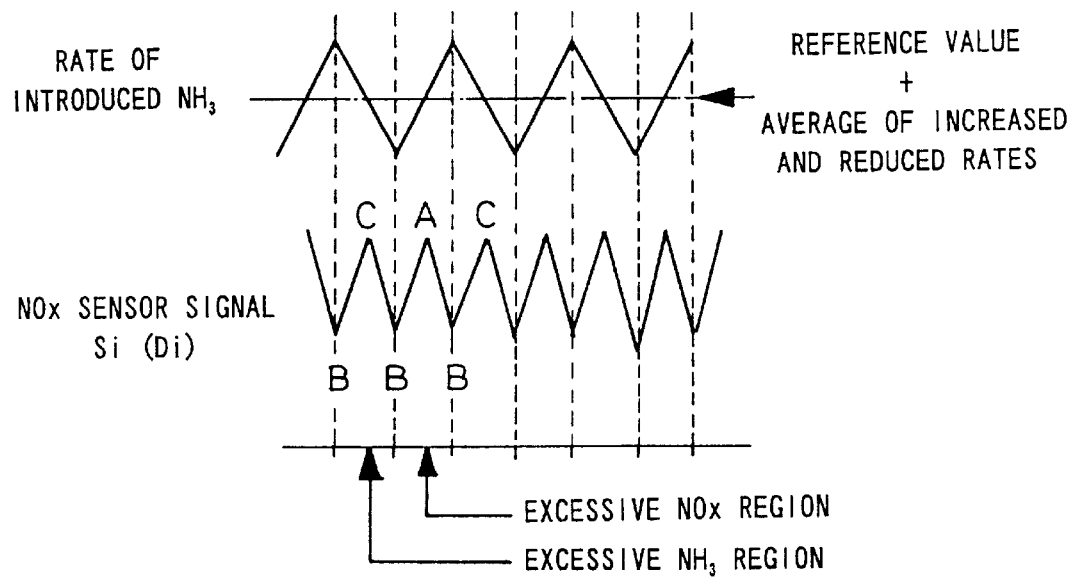
FIG. 7 is a timing chart of a control sequence of the process of controlling the rate of $NH_3$ to be introduced in the NOx removal system according to the first embodiment of the present invention.

The point B shown in FIGS. 6 and 7 represents an $NH_3$–NOx equivalent point. At this point B, the catalyst in the NOx remover 68 discharges a slight amount of $NH_3$ and NOx depending on the efficiency of the catalyst. Even though the control signal Sc is issued to reduce $NH_3$ from the point B on, the detected signal Si still represents an excessive content of $NH_3$ because of the distance between the inlet 90 and the NOx sensor 70, and therefore $NH_3$ is recognized as being excessively discharged.

More specifically, the rate of the $NH_3$ gas introduced from the $NH_3$ supply controller 72 into the exhaust pipe 66 starts being reduced from the time when the control unit 86 issues the control signal Sc. Inasmuch as it takes a certain period of time for the reduced $NH_3$ gas to pass from the inlet 90 through the NOx remover 68 to the NOx sensor 70, the detected signal Si (Di) has a waveform during that period of time which temporarily indicates an excessive introduction of $NH_3$ until it reaches a peak value, at a point C (see FIG. 7). When the reduced $NH_3$ reaches the NOx sensor 70, the data value Di of the detected signal Si starts to be reduced again.

Since the rate of the $NH_3$ gas introduced from the $NH_3$ supply controller 72 into the exhaust pipe 66 is continuously decreasing at this time, the data value Di of the detected signal Si is gradually reduced again. When the data value Di switches again from a reducing tendency to an increasing tendency at another point B, the control unit 86 issues a control signal Sc to the rate adjuster 132 to increase the rate of the $NH_3$ gas to be introduced into the exhaust pipe 66. The rate adjuster 82 now gradually increases the rate of the $NH_3$ gas introduced into the exhaust pipe 66. From this stage on, the NOx sensor 70 is sensitive to NOx supplied thereto and produces an output signal whose waveform varies as the supplied NOx varies.

Even though the rate of the $NH_3$ gas introduced into the exhaust pipe 66 is increased, the rate of the $NH_3$ gas at the NOx sensor 70 remains small, i.e., the rate of the NOx at the NOx sensor 70 remains large, for a while because of the distance between the inlet 90 and the NOx sensor 70, and the data value Di of the detected signal Si increase. When the detected signal Si from the NOx sensor 70 reaches a peak value at a point A and the increased $NH_3$ gas reaches the NOx sensor 70, the data value Di of the detected signal Si decreases again toward another $NH_3$–NOx equivalent point B.

The NOx removal system according to the first embodiment thus repeats the above cycle of control operation to increase and reduce the rate of the $NH_3$ gas introduced into the exhaust pipe 66 above and below a level where the total amount of $NH_3$ and NOx is minimum, i.e., an optimum level (=a reference value+an average value of increased and reduced amounts).

Figure 8:
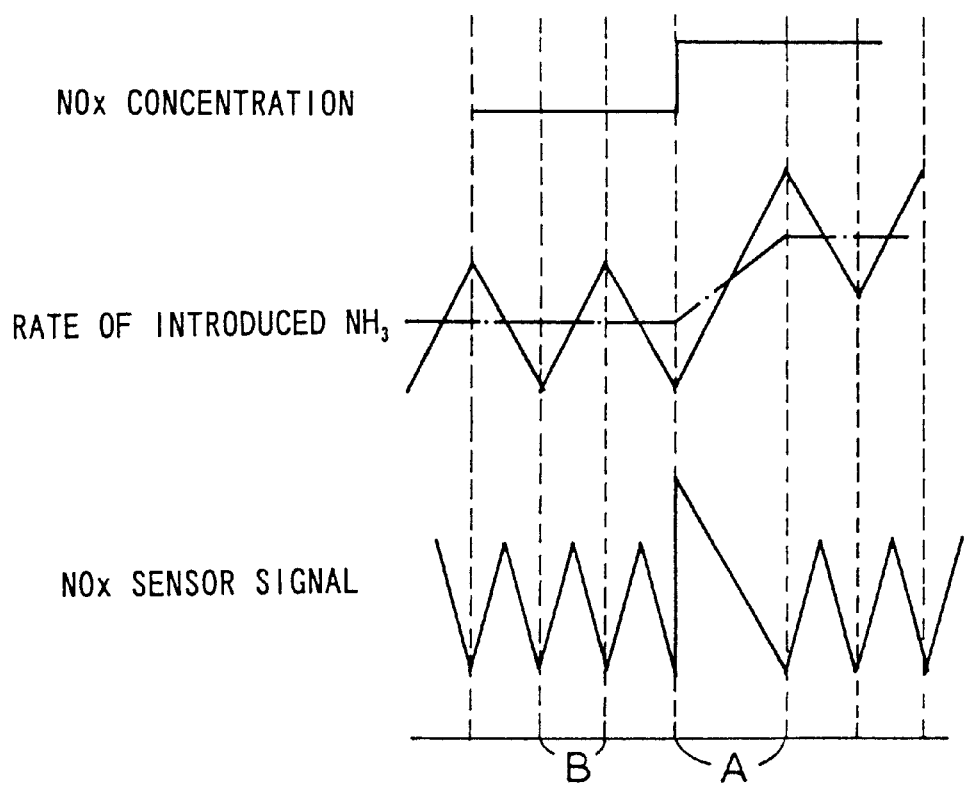
FIG. 8 is a timing chart of a control sequence of the process of controlling the rate of $NH_3$ to be introduced in the NOx removal system according to the first embodiment of the present invention, when the concentration of NOx is abruptly increased.

When the amount of NOx contained in the exhaust gases emitted from the combustion apparatus 64 abruptly increases stepwise, as shown in FIG. 8, the data value Di of the detected signal Si issued from the NOx sensor 70 increases to a higher level, and the control unit 86 issues a control signal Sc to the rate adjuster 82 for increasing the rate of $NH_3$ to be introduced into the exhaust pipe 66, for a longer period A than previous periods B. As a result, the rate of $NH_3$ to be introduced into the exhaust pipe 66 is increased.

When the amount of NOx contained in the exhaust gases emitted from the combustion apparatus 64 decreases, the control operation is reversed, reducing the rate of $NH_3$ to be introduced into the exhaust pipe 66.

The above process is equivalent to shifting the reference value for the rate of $NH_3$ to be introduced into the exhaust pipe 66, upwardly or downwardly as thus concentration of NOx increases or decreases.

Therefore, the NOx removal system according to the first embodiment is capable of accurately controlling the rate of $NH_3$ to be introduced into the exhaust pipe 66 to minimize amounts of $NH_3$ and NOx discharged from the NOx remover 68.

In FIG. 7, the rate of $NH_3$ to be introduced into the exhaust pipe 66 is controlled according to a triangular pattern, i.e., gradually increased and reduced alternately, by the control signal Sc supplied from the control unit 86 to the rate adjuster 82. However, the rate of $NH_3$ to be introduced into the exhaust pipe 66 may be controlled according to a pattern having sudden upward and downward jumps.

Figure 9:
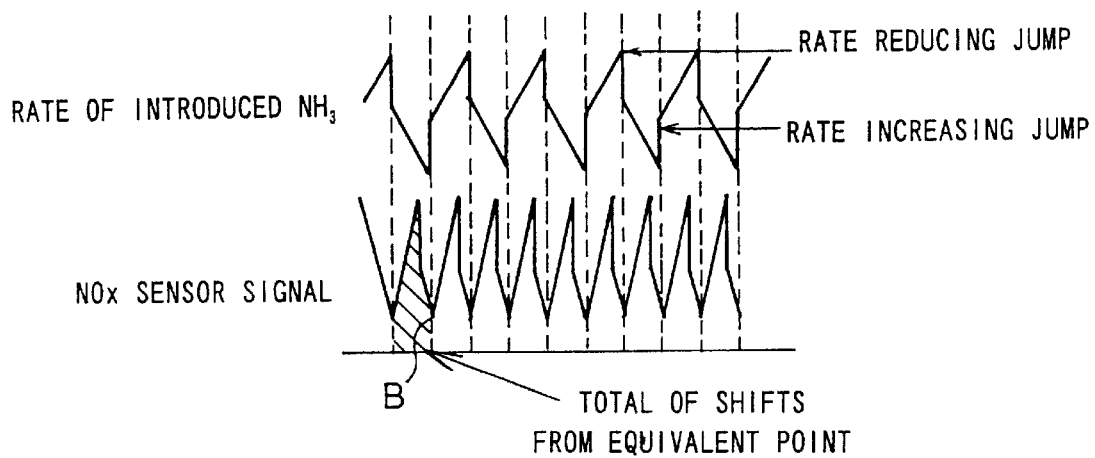
FIG. 9 is a timing chart of another control sequence of the process of controlling the rate of $NH_3$ to be introduced in the NOx removal system according to the first embodiment of the present invention.

Specifically, as shown in FIG. 9, when the data value Di of the detected signal Si issued from the NOx sensor 70 changes from a reducing tendency to an increasing tendency at a point B, the control unit 86 issues a control signal Sc for increasing the rate of $NH_3$ to be introduced into the exhaust pipe 66. Based on the control signal Sc from the control unit 86, the rate adjuster 82 abruptly increases the rate of $NH_3$ stepwise up to a certain level, and thereafter gradually increases the rate of $NH_3$ linearly. When a next point B is reached, based on the control signal Sc from the control unit 86, the rate adjuster 82 abruptly decreases the rate of $NH_3$ stepwise down to a certain level, and thereafter gradually decreases the rate of $NH_3$ linearly.

The control sequence shown in FIG. 9 serves to shorten periods of switching between increased and reduced rates of $NH_3$ and reduce a total shift (shown hatched) from, the $NH_3$–NOx equivalent point B, compared with the control sequence shown in FIG. 7. Therefore, the control sequence shown in FIG. 9 is more stable than the control sequence shown in FIG. 7.

It is preferable to set those abrupt rate jumps to such values that the jumps will end near the $NH_3$–NOx equivalent points B by selecting the abrupt rate jumps in view of the time in which the $NH_3$ gas reaches the NOx sensor 70, i.e., a delay time of the $NH_3$ control loop, based on the distance from the inlet 90 to the NOx sensor 70, and speeds at which the rates of $NH_3$ are increased and reduced.

If the speeds at which the rates of $NH_3$ are increased and reduced are reduced and the abrupt rate jumps are suitably selected, then it is possible to minimize the peak values of fluctuations of the concentration of $NH_3$ and reduce the total shift (an integral of the shift) from the $NH_3$–NOx equivalent point B.

Therefore, the NOx removal system according to the first embodiment is capable of controlling the rate of $NH_3$ to be introduced into the exhaust pipe 66 so as to minimize the amount of $NH_3$+NOx.

The NOx removal system according to the second embodiment of the present invention will be described below with reference to FIG. 10. Those parts of the NOx removal system shown in FIG. 10 which are identical to the NOx removal system shown in FIG. 4 are denoted by identical reference numerals and will not be described in detail below.

Figure 10:
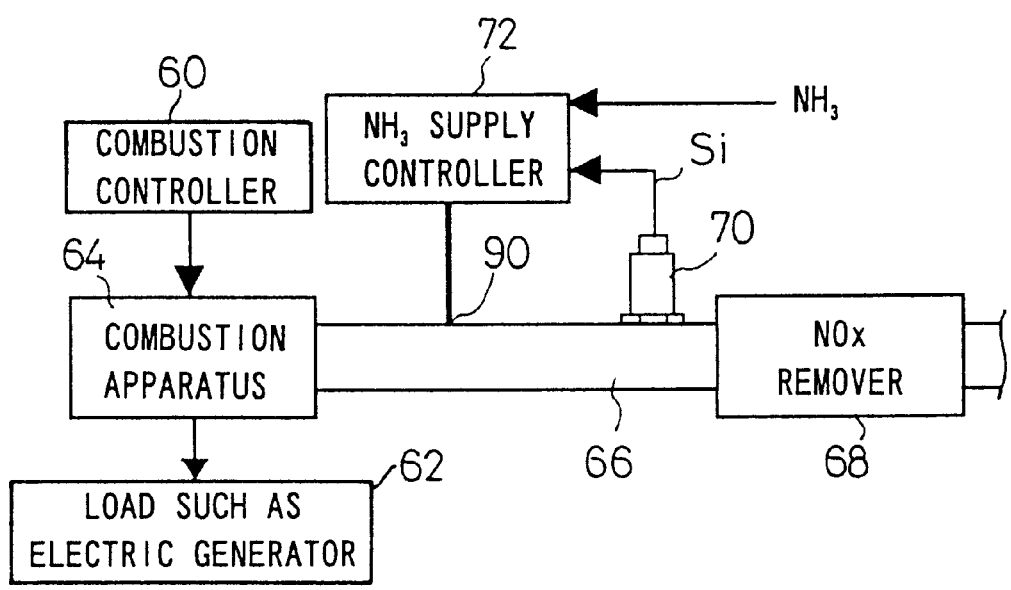
FIG. 10 is a block diagram of the NOx removal system according to the second embodiment of the present invention.

As shown in FIG. 10, the removal system according to the second embodiment differs from the NOx removal system shown in FIG. 4 in that the NOx sensor 70 is connected to the exhaust pipe 66 between the inlet 90 and the NOx remover 68.

The removal system according to the second embodiment controls the rate of $NH_3$ to be introduced into the exhaust pipe 66 based on the detected signal Si issued from the NOx sensor 70. As with the removal system according to the first embodiment, the NOx sensor 70 may comprise a pumping NOx sensor comprising an oxygen pump as shown in FIG. 1 or a combination of an oxygen pump and an NOx-sensitive semiconductor as shown in FIGS. 2A through 2C.

If the NOx sensor shown in FIG. 1 is employed, then a catalyst 54 for causing a reaction represented by $NH_3 + NOx \rightarrow N_2 + H_2O$ is disposed in the first diffusion rate controller 20, or in the first chamber 24, or at the inlet of the first diffusion rate controller 20, or in at least two of these locations.

Figure 11A:
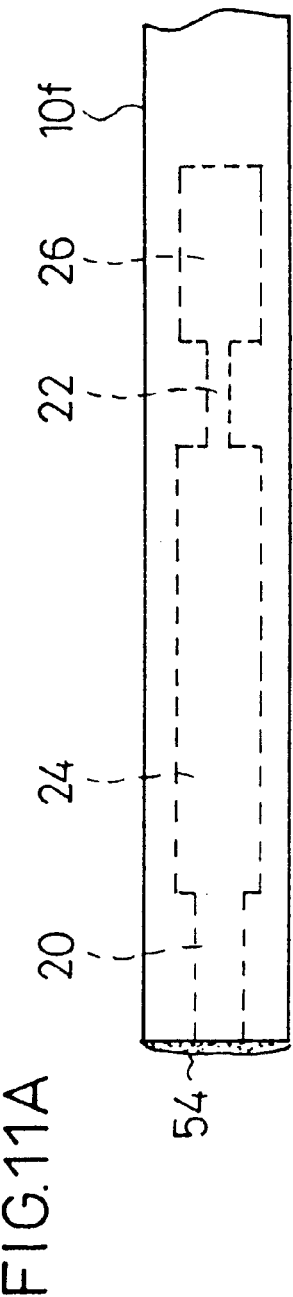
FIG. 11A is a plan view of an NOx sensor for use in the NOx removal system according to the second embodiment of the present invention, with an NOx removal catalyst disposed at the inlet of a first diffusion rate controller.
Figure 11B:
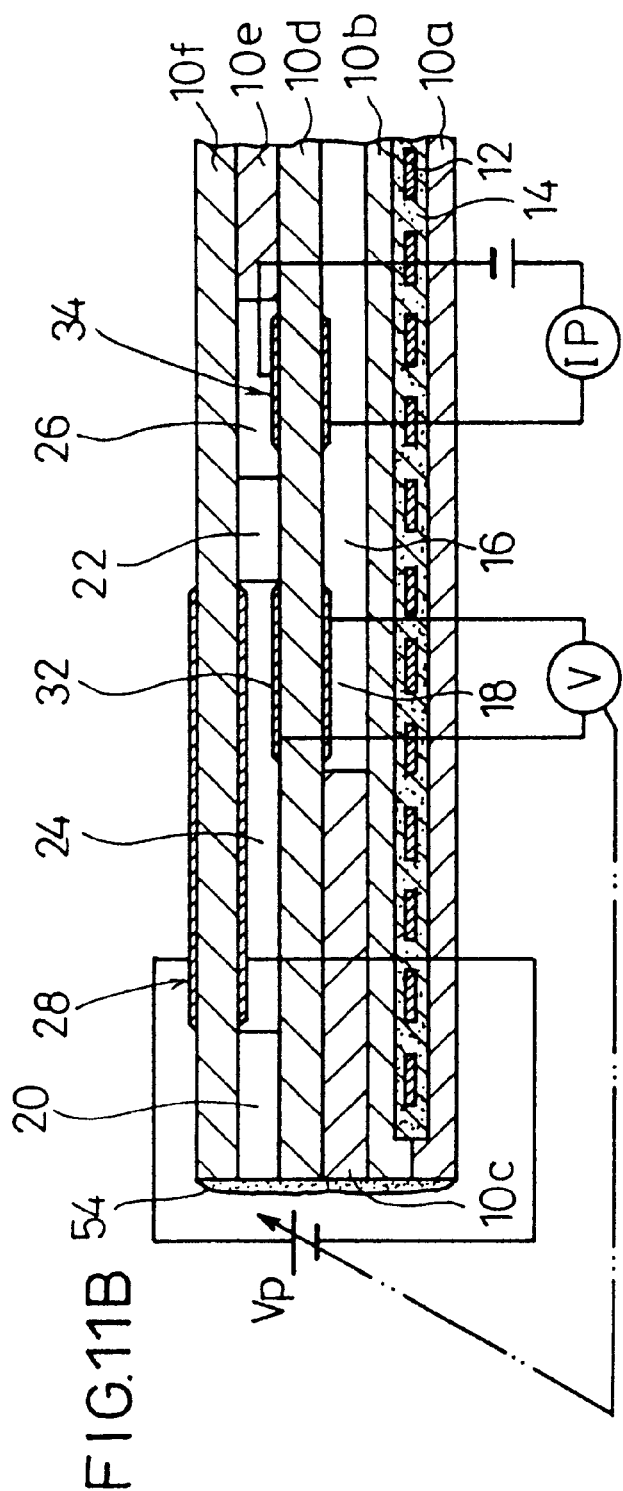
FIG. 11B is a longitudinal cross-sectional view of the NOx sensor shown in FIG. 11A.
Figure 12:
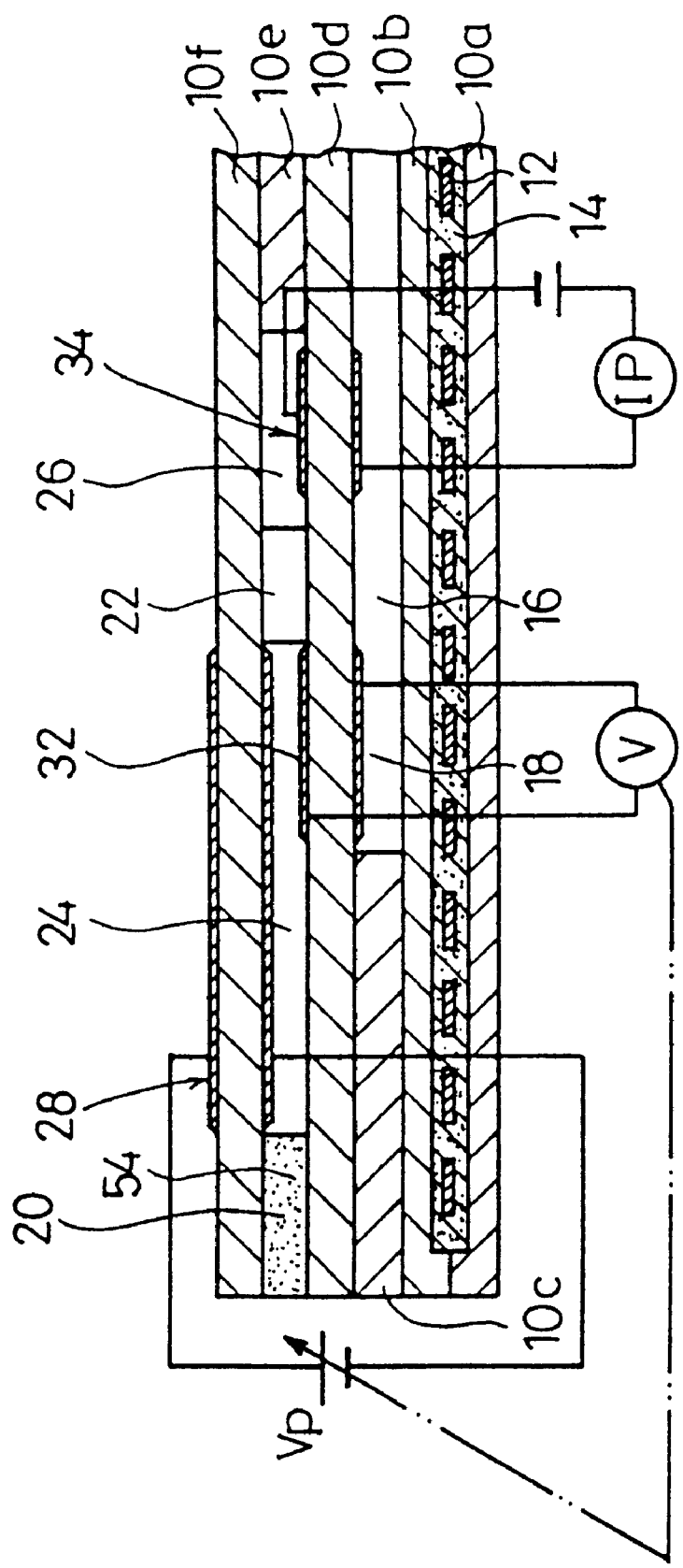
FIG. 12 is a longitudinal cross-sectional view of another NOx sensor for use in the NOx removal system according to the second embodiment of the present invention, with an NOx removal catalyst disposed in a first diffusion rate controller.
Figure 13:
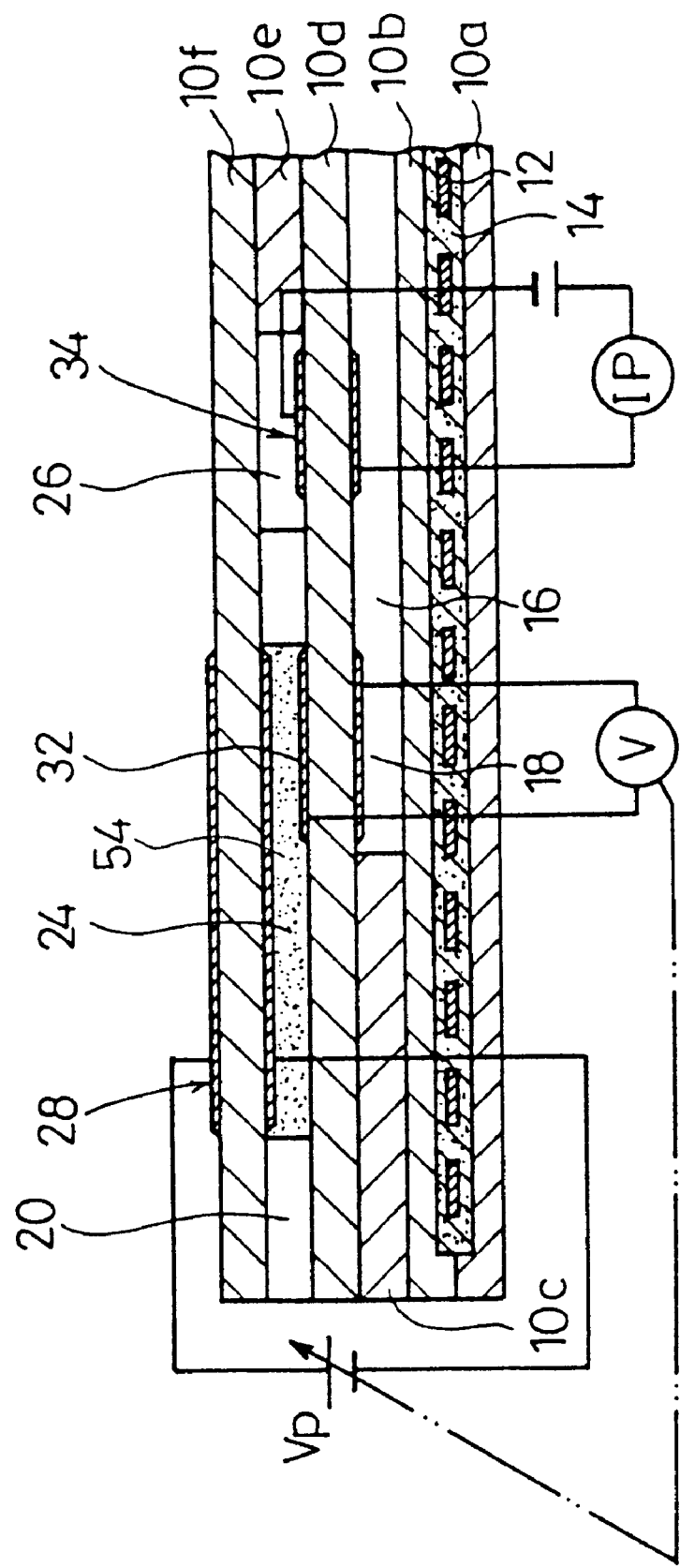
FIG. 13 is a longitudinal cross-sectional view of still another NOx sensor for use in the NOx removal system according to the second embodiment of the present invention, with an NOx removal catalyst disposed in a first chamber.

FIGS. 11A and 11B show the NOx sensor with the catalyst 54 disposed at the inlet of the first diffusion rate controller 20. FIG. 12 shows the NOx sensor with the catalyst 54 disposed in the first diffusion rate controller 20. FIG. 13 shows the NOx sensor with the catalyst 54 disposed in the first chamber 24. The catalyst 54 is made of porous alumina carrying Pt. Alternatively, the catalyst 54 may be made of porous alumina carrying $Fe_2O_3$, $Cr_2O_3$, $V_2O_5$, or the like. If the combination of the oxygen pump and the NOx-sensitive semiconductor as shown in FIGS. 2A through 2C is employed, then a catalyst for causing a reaction represented by $NH_3+NOx\rightarrow N_2+H_2O$ is disposed in the diffusion control chamber 20, or in the measuring chamber 24, or at the inlet of the of the first diffusion rate controller 20, or in at least two of these locations.

In either of these NOx sensors, the catalyst causes a reaction represented by $NH_3+NOx\rightarrow N_2+H_2O$, and excessive NOx is detected by the NOx sensor, which issues a detected signal Si. When $NH_3$ is introduced excessively, it gives rise to a reaction represented by $NH_3+O_2\rightarrow NO+H_2O$ in the first space 24 or the measuring space 24, thus generating NO corresponding to the excessive $NH_3$. Therefore, the NOx sensor generates a detected signal Si corresponding to the excessive $NH_3$.

The removal system according to the second Embodiment carries out essentially the same control process as with the removal system according to the first embodiment. Because of the structure of the NOx sensor 70 employed by the removal system according to the second embodiment, the removal system according to the second embodiment controls the rate of $NH_3$ to be introduced into the exhaust pipe 66 in the vicinity of the $NH_3$–NOx equivalent point B.

The removal system according to the second embodiment can increase the speeds at which the rates of $NH_3$ are increased and reduced for shortening the periods of switching between increased and reduced rates of $NH_3$, compared with the removal system according to the first embodiment.

By establishing the speeds at which the rates of $NH_3$ are increased and reduced, the rate increasing jumps, and rate reducing jumps for thereby reducing the peak values of the detected signal Si of the NOx sensor 70, reducing a total shift from the $NH_3$–NOx equivalent point B, and shortening periods of switching between increased and reduced rates of $NH_3$, it is possible to reduce a flow of NOx and $NH_3$ downstream of the catalyst, i.e., into a rear stage of the NOx remover.

Specifically, even when slight amounts of NOx and $NH_3$ are excessively produced, they are averaged in the NOx remover 68. If the averaged amounts of NOx and $NH_3$ are equal to each other, then any flow of these gases downstream of the catalyst is minimized. It is effective to control the NOx removal system to make peaks of excessive amounts of NOx and $NH_3$ smaller as the periods of switching between increased and reduced rates of $NH_3$ are shorter.

Inasmuch as the NOx removal catalyst is combined with the NOx sensor 70 and the NOx sensor 70 is connected between the inlet 90 and the NOx remover 68 for controlling the rate of $NH_3$ to be introduced into the exhaust pipe 66, the NOx removal system according to the second embodiment is more effective to reduce the discharge of NOx and $NH_3$ than the NOx removal system according to the first embodiment.

Furthermore, the accuracy of the control process is higher as the distance from the inlet 90 to the NOx sensor 70 is smaller for higher control rate.

The NOx removal system according to the third embodiment will be described with reference to FIG. 14. Those parts of the NOx removal system shown in FIG. 14 which are identical to the NOx removal system shown in FIG. 4 are denoted by identical reference numerals and will not be described in detail below.

Figure 14:
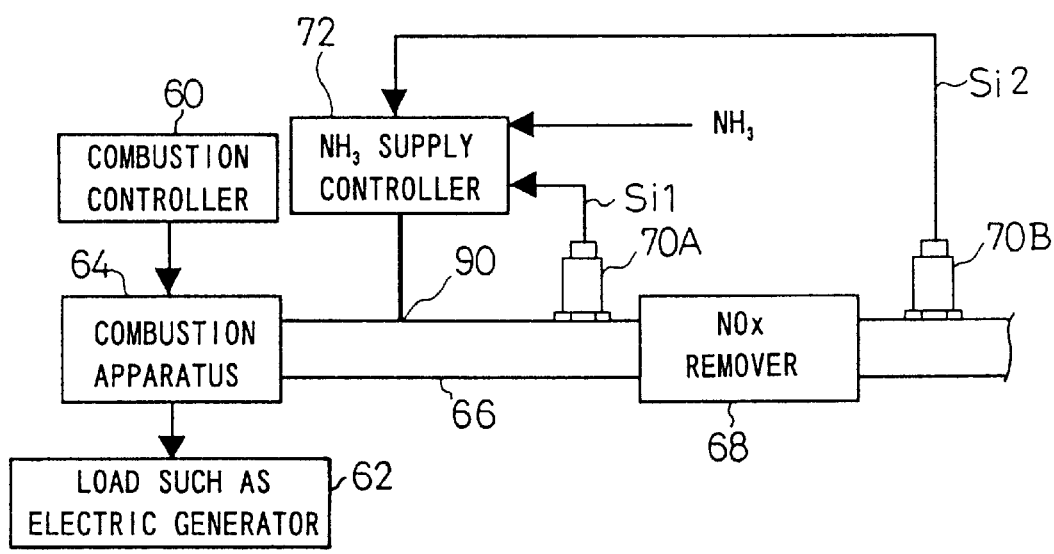
FIG. 14 is a block diagram of the NOx removal system according to the third embodiment of the present invention.

As shown in FIG. 14, the removal system according to the third embodiment differs from the NOx removal system shown in FIG. 4 in that a first NOx sensor 70A is connected to the exhaust pipe 66 between the inlet 90 and the NOx remover 68 and a second NOx sensor 70B is connected downstream of the NOx remover 68. Therefore, the removal system according to the third embodiment is a combination of the removal systems according to the first and second embodiments.

In the removal system according to the third embodiment, while the system controls the rate of $NH_3$ to be introduced into the exhaust pipe 66 based on a detected signal Si1 issued from the first NOx sensor 70A, the controlling on the rate of $NH_3$ is corrected based on a detected signal Si2 issued from the second NOx sensor 70B.

As with the removal system according to the first embodiment, each of the NOx sensors 70A, 70B may comprise a pumping NOx sensor comprising an oxygen pump as shown in FIG. 1 or a combination of an oxygen pump and an NOx-sensitive semiconductor as shown in FIGS. 2A through 2C.

Figure 15A:
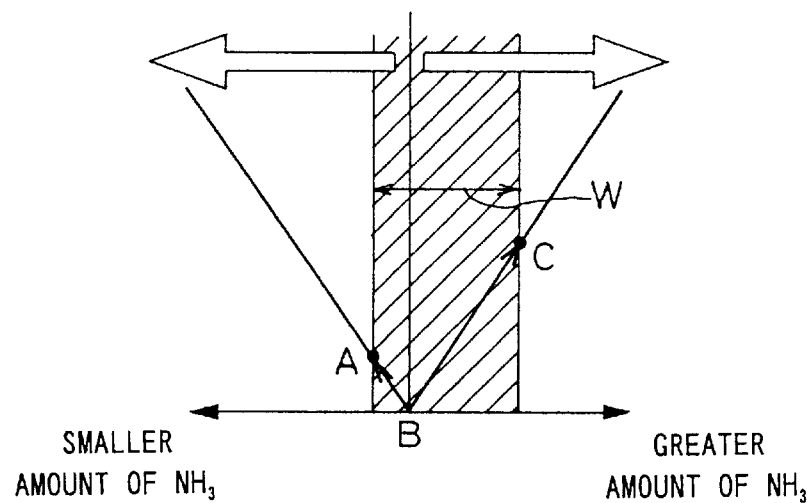
FIGS. 15A and 15B are diagrams showing, by way of example, a correcting process based on a detected signal from a second NOx sensor in the NOx removal system according to the third embodiment of the present invention, for an instance in which $NH_3$ deviates from an $NH_3$–NOx equivalent point toward an excessively greater amount of $NH_3$.
Figure 15B:
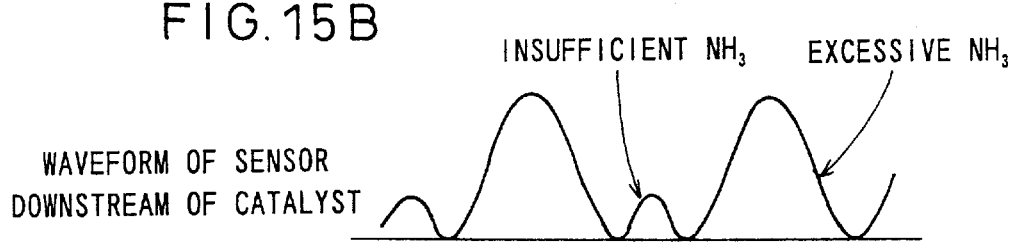

The removal system according to the third embodiment carries out a control process as follows:

If $NH_3$ is excessive, i.e., if a fluctuation interval W of $NH_3$ is shifted from the $NH_3$–NOx equivalent point B toward an excessive $NH_3$ region, as shown in FIG. 15A, then since the peak values of a signal waveform for excessive $NH_3$ are greater than the peak values of a signal waveform for insufficient $NH_3$, as shown in FIG. 15B, the ratio between the speeds of increasing and reducing the rate of $NH_3$ to be introduced into the exhaust passage 66 is corrected and the ratio between the rate increasing and reducing jumps is corrected so as to equalize those peak values. Furthermore, the speeds of increasing and reducing the rate of $NH_3$ to be introduced into the exhaust passage 66 and the rate increasing and reducing jumps are corrected in order to minimize the peak values.

It is preferable to correct the above speeds and jumps so that the integral of the signal waveform will be minimized.

Figure 16A:
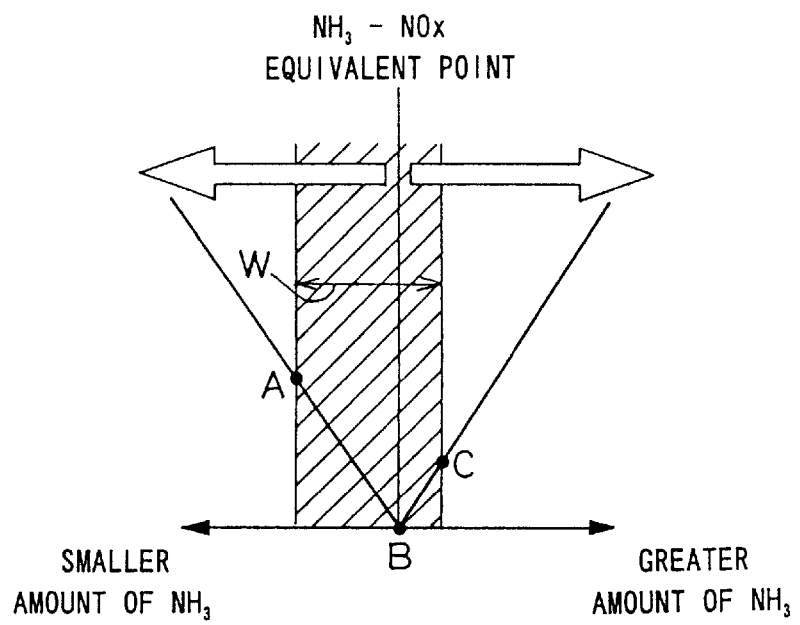
FIGS. 16A and 16B are diagrams showing, by way of example, a correcting process based on a detected signal from a second NOx sensor in the NOx removal system according to the third embodiment of the present invention, for an instance in which $NH_3$ deviates from an $NH_3$–NOx equivalent point toward an excessively smaller amount of $NH_3$.
Figure 16B:
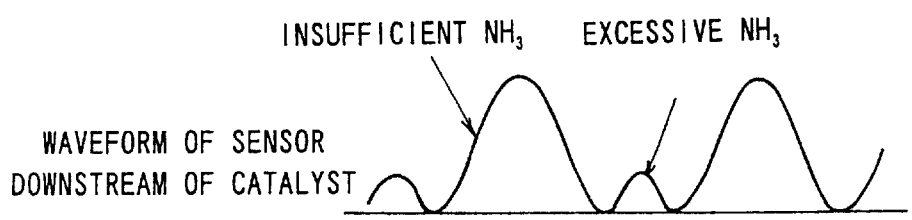

On the other hand, if $NH_3$ is insufficient, i.e., if a fluctuation interval W of $NH_3$ is shifted from the $NH_3$–NOx equivalent point B toward an insufficient $NH_3$ region, as shown in FIG. 16A, then since the peak values of a signal waveform for insufficient $NH_3$ are greater than the peak values of a signal waveform for excessive $NH_3$, as shown in FIG. 16B, the ratio between the speeds of increasing and reducing the rate of $NH_3$ to be introduced into the exhaust passage 66 is corrected and the ratio between the rate increasing and reducing jumps is corrected so as to equalize those peak values. Furthermore, the speeds of increasing and reducing the rate of $NH_3$ to be introduced into the exhaust passage 66 and the rate increasing and reducing jumps are corrected in order to minimize the peak values.

It is also preferable to correct the above speeds and jumps so that the integral of the signal waveform will be minimized.

A process of correcting the speeds of increasing and reducing the rate of $NH_3$ to be introduced into the exhaust passage 66 (hereinafter referred to as "rate increasing and reducing speeds") will be described in specific detail below with reference to FIGS. 17 through 20.

The process of correcting the rate increasing and reducing speeds is carried out by the control unit 86 when the control unit 86 (see FIG. 5) runs a rate increasing and reducing speed correcting means (rate increasing and reducing speed correcting program) which is loaded from the program ROM into the memory 84.

Figure 17:
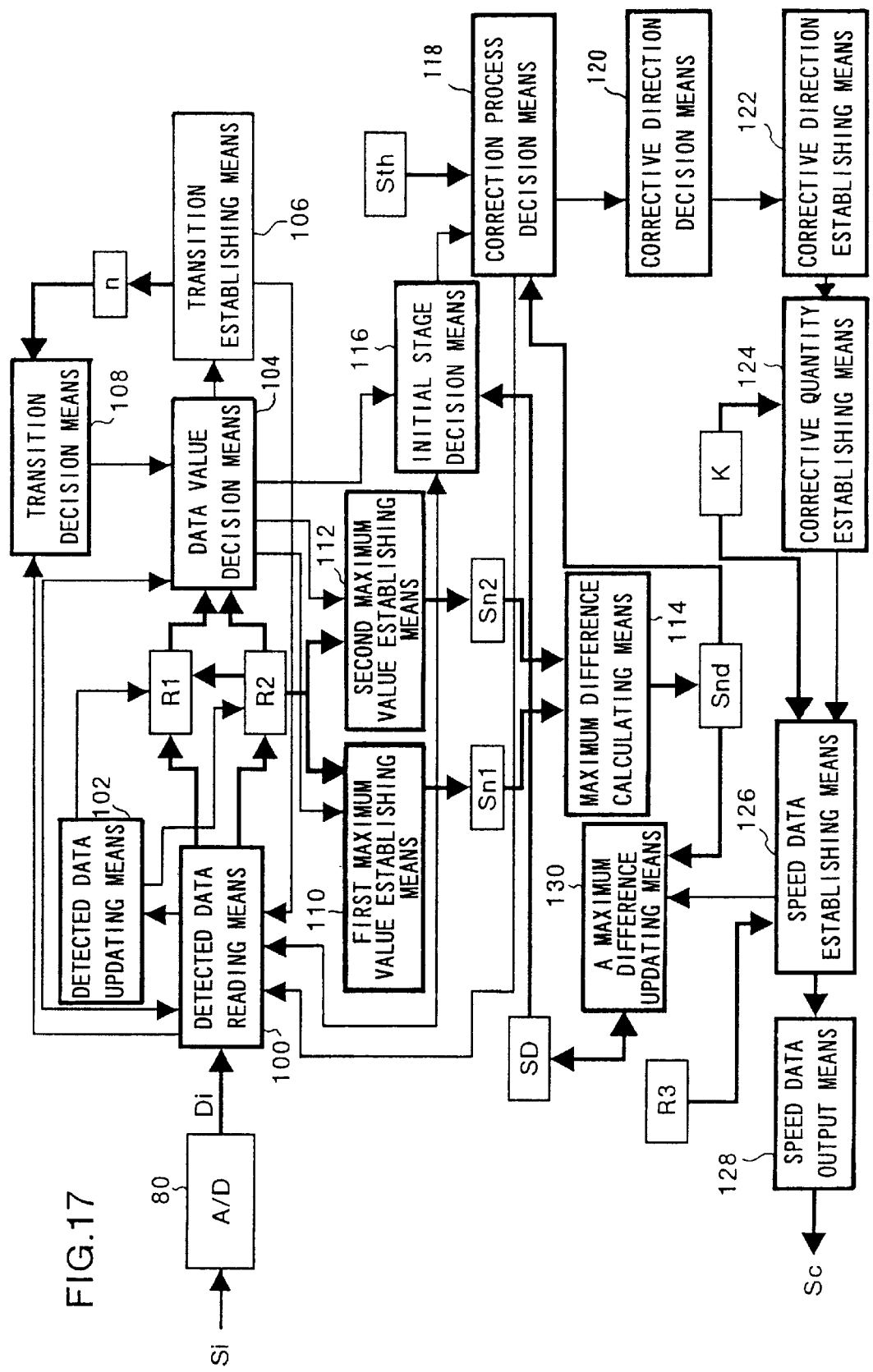
FIG. 17 is a functional block diagram of a rate increasing and reducing speed correcting means in a controller of the NOx removal system according to the third embodiment of the present invention.

As shown in FIG. 17, the rate increasing and reducing speed correcting means has a detected data reading means 100 for reading detected data Di successively delivered from an A/D converter 80.

Only in an initial stage, the detected data reading means 100 reads two detected data Di, Di+1 delivered in series from the A/D converter 80, and stores them as preceding and present detected data Do, Dn respectively in first and second registers R1, R2. In other stages, the detected data reading means 100 stores detected data Di delivered from the A/D converter 80 as present detected data Dn in the second register R2.

The rate increasing and reducing speed correcting means also has a detected data updating means 102 for storing the data (present detected data Dn) in the second register R2 as preceding detected data Do in the first register R1, a data value decision means 104 for determining the magnitudes of the preceding detected data Do and the present detected data Dn, a transition establishing means 106 for establishing a data transition indicative of whether the detected data Di is increasing or decreasing based on the decision made by the data value decision means 104 and storing an attribute of the data transition in a register n, a transition decision means 108 for determining what transitional condition the present data value is in based on the transition attribute stored in the register n, a first maximum value establishing means 110 for establishing the data (present detected data Dn) in the second register R2 as a first maximum value based on the decision made by the data value decision means 104 and storing the established first maximum value in a register Sn1, a second maximum value establishing means 112 for establishing the data (present detected data Dn) in the second register R2 as a second maximum value based on the decision made by the data value decision means 104 and storing the established second maximum value in a register Sn2, a maximum difference calculating means 114 for calculating the difference between the first maximum value stored in the register Sn1 and the second maximum value stored in the register Sn2, and storing the difference as a present differential value in a register Snd, an initial stage decision means 116 for determining whether the process is in an initial stage or not based on data (preceding differential value) stored in a register SD, a correction process decision means 118 for determining whether the correction process needs to be presently carried out or not based on the value (present differential value) stored in the register Snd and data (threshold value) stored in a register Sth, a corrective direction decision means 120 for determining whether the rate of $NH_3$ to be introduced into the exhaust passage 66 is to be increased or reduced on the basis of the value (present differential value) stored in the register Snd and the data (preceding differential value) stored in the register SD, a corrective direction establishing means 122 for establishing an attribute of the corrective direction as a positive value (to increase the rate of $NH_3$ to be introduced into the exhaust passage 66) or a negative value (to reduce the rate of $NH_3$ to be introduced into the exhaust passage 66) based on the decision made by the corrective direction decision means 120, a corrective quantity establishing means 124 for updating a corrective quantity stored in a register K based on a present corrective direction attribute and storing the updated corrective quantity in the register K again, a speed data establishing means 126 for adding the updated corrective quantity (value stored in the register K) from the corrective quantity establishing means 124 to a predetermined basic speed value (value stored in a third register R3) and establishing the sum as present, speed data Sc, a speed data output means 128 for outputting the present speed data Sc established by the speed data establishing means 126 to the rate adjuster 82 (see FIG. 5), and a maximum difference updating means 130 for updating the preceding differential value as the present differential value.

These means shown in FIG. 17 comprise steps or functions performed by the control unit 86 when it runs the rate increasing and reducing speed correcting program.

A processing sequence carried out by the control unit 86 based on the rate increasing and reducing speed correcting program will be described below with reference to FIGS. 18, 19, and 20.

Figure 18:
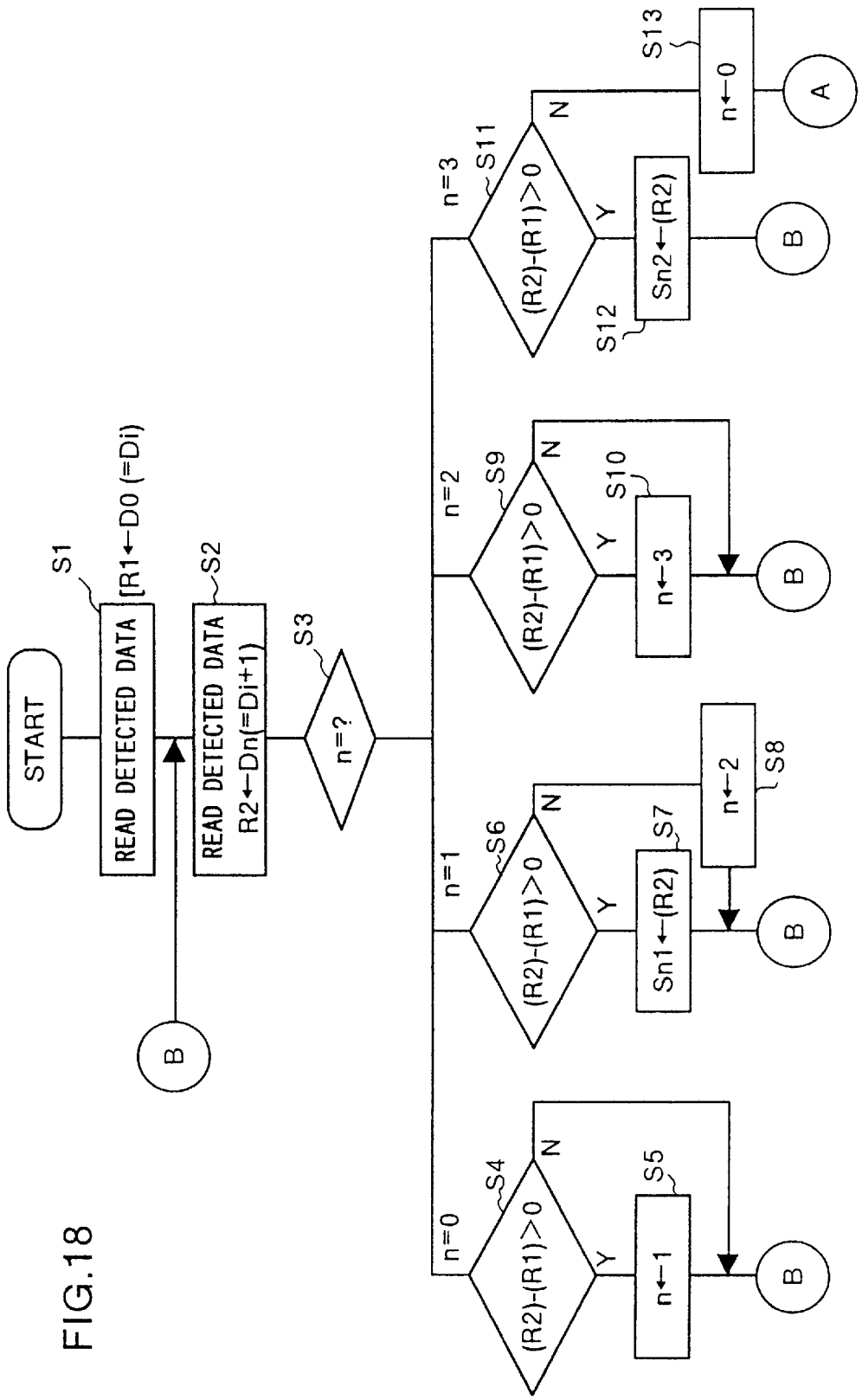
FIGS. 18 and 19 are flowcharts of a processing operation of the rate increasing and reducing spewed correcting means shown in FIG. 17.

As shown in FIG. 18, the detected data reading means 100 reads detected data Di successively delivered from the A/D converter 80 at a processing start time t0 (see FIG. 20), and stores the detected data Di as preceding detected data Do in the first register R1 in a step S1.

Then, in a step S2, the detected data reading means 100 reads next detected data Di+1 delivered from the A/D converter 80, and stores the detected data Di+1 as present detected data Dn in the second register R2.

In a step S3, the transition decision means 108 determine a present transitional condition of the detected data Di based on the transition attribute stored in the register n.

If the transition attribute stored in the register n is "0" indicating the present transitional condition is a first reducing cycle, then control goes to a step S4 in which the data value decision means 104 determines the magnitudes of the preceding detected data Do and the present detected data Dn. Specifically, the data value decision means 104 determines whether the difference between the data stored in the second register R2 and the first register R1 is greater than "0" or not.

If the difference is equal to or smaller than "0", then control goes back to the step S2. In the step S2 in a second or following cycle, the detected data updating means 102 stores the data (present detected data Dn) in the second register R2 as preceding detected data Do in the first register R1, and the detected data reading means 100 reads detected data Di delivered from the A/D converter 80 and stores the detected data Di as present detected data Dn in the second register R2. The process carried out by the detected data updating means 102 to transfer the data from the second register R2 to the first register R1 will be referred to as a process of updating the detected data.

A sequence of the steps S2, S3, S4, S2 is carried out until the data (present detected data Dn) in the second register R2 becomes larger than the data (preceding detected data Do) in the first register R1 at a time t1.

At the time t1, the difference becomes larger than "0" in the step S4. Then, control proceeds from the step S4 to a step S5 in which the transition establishing means 106 stores a transition attribute "1" indicating a first increasing cycle in the register n. Thereafter, control returns to the step S2 in which the detected data updating means 102 updates the detected data, after which the detected data reading means 100 reads next detected data Di. After the step S3, control goes to a step S6.

In the step S6, the data value decision means 104 determines the magnitudes of the preceding detected data Do and the present detected data Dn. Specifically, as with the step S4, the data value decision means 104 determines whether the difference between the data stored in the second register R2 and the first register R1 is greater than "0" or not.

If the difference is greater than "0", then control goes to a step S7 in which the first maximum value establishing means 110 stores the data (present detected data Dn) in the second register R2 as a first maximum value in the register Sn1. Thereafter, control returns to the step S2 in which the detected data updating means 102 updates the detected data, after which the detected data reading means 100 reads next detected data Di.

A sequence of the steps S2, S3, S6, S7, S2 is carried out until the data (present detected data Dn) in the second register R2 becomes equal to or smaller than the data (preceding detected data Do) in the first register R1 at a time t2. The data in the register Sn1 is successively rewritten into the detected data Di (=Dn) read in the step S2.

At the time t2, the difference becomes equal or smaller than "0" in the step S6. Then, control proceeds from the step S6 to a step S8 in which the transition establishing means 106 stores a transition attribute "2" indicating a second reducing cycle in the register n. Thereafter, control returns to the step S2 in which the detected data updating means 102 updates the detected data, after which the detected data reading means 100 reads next detected data Di. After the step S3, control goes to a step S9.

In the step S9, the data value decision means 104 determines the magnitudes of the preceding detected data Do and the present detected data Dn. Specifically, as with the steps S4, S6, the data value decision means 104 determines whether the difference between the data stored in the second register R2 and the first register R1 is greater than "0" or not.

If the difference is equal or smaller than "0", then control goes back to the step S2. In the step S2, the detected data updating means 102 updates the detected data, after which the detected data reading means 100 reads next detected data Di.

A sequence of the steps S2, S3, S9, S2 is carried out until the data (present detected data Dn) in the second register R2 becomes larger than the data (preceding detected data Do) in the first register R1 at a time t3.

At the time t3, the difference becomes larger than "0". in the step S9. Then, control proceeds from the step S9 to a step S10 in which the transition establishing means 106 stores a transition attribute "3" indicating a second increasing cycle in the register n. Thereafter, control returns to the step S2 in which the detected data updating means 102 updates the detected data, after which the detected data reading means 100 reads next detected data Di. After the step S3, control goes to a step S11.

In the step S11, the data value decision means 104 determines the magnitudes of the preceding detected data Do and the present detected data Dn. If the difference between the data stored in the second register R2 and the first register R1 is greater than "0" in the step S11, then control goes to a step S12 in which the second maximum value establishing means 112 stores the data (present detected data Dn) in the second register R2 as a second maximum value in the register Sn2. Thereafter, control returns to the step S2 in which the detected data updating means 102 updates the detected data, after which the detected data reading means 100 reads next detected data Di.

A sequence of the steps S2, S3, S11, S12, S2 is carried out until the data (present detected data Dn) in the second register R2 becomes equal to or smaller than the data (preceding detected data Do) in the first register R1 at a time t4. The data in the register Sn2 is successively rewritten into the detected data Di (=Dn) read in the step S2.

At the time t4, the difference becomes equal or smaller than "0" in the step S6. Then, control proceeds from the step S11 to a step S13 in which the transition establishing means 106 stores a transition attribute "0" indicating the first reducing cycle in the register n.

Then, control proceeds to a step S14 (see FIG. 19) in which the maximum difference calculating means 114 calculates the difference between the first maximum value stored in the register Sn1 and the second maximum value stored in the register Sn2, and stores the absolute value of the difference as a present differential value in the register Snd.

In a next step S15, the initial stage decision means 116 determines whether the process is in an initial stage (i.e., a state in which only the first differential value has been obtained) or not, by determining whether the value in the register SD which stores a preceding differential value is an initial value or not. The initial value may be a value which is impossible as a setting value, e.g., "999" of the decimal notation.

If the value stored in the register SD is an initial value, then control goes to a step S16 in which the maximum difference updating means 130 updates the preceding differential value as the value (present differential value) stored in the register Snd, and stores it in the register SD. Thereafter, control returns to the step S16 in which the detected data updating means 102 updates the detected data, after which the detected data reading means 100 reads next detected data Di. Control then goes through the step S3 to the step S4. Since "0" is stored in the register n in the step S13, control proceeds from the step S3 to the step S4.

A sequence of the steps S2, S3, S4, S2 is executed until a time t5, storing "1" in the register n. Thereafter, a sequence of the steps S2, S3, S6, S7 is executed until a time t6. Detected data at the time t6 is stored as a first maximum value in the register Sn1, and at the same time "2" is stored in the register n.

Subsequently, a sequence of the steps S2, S3, S9, S2 is executed until a time t7, storing "3" in the register n. Thereafter, a sequence of the steps S2, S3, S11, S12 is executed until a time t8. Detected data at the time t8 is stored as a second maximum value in the register Sn2, and at the same time "0" is stored in the register n.

Figure 19:
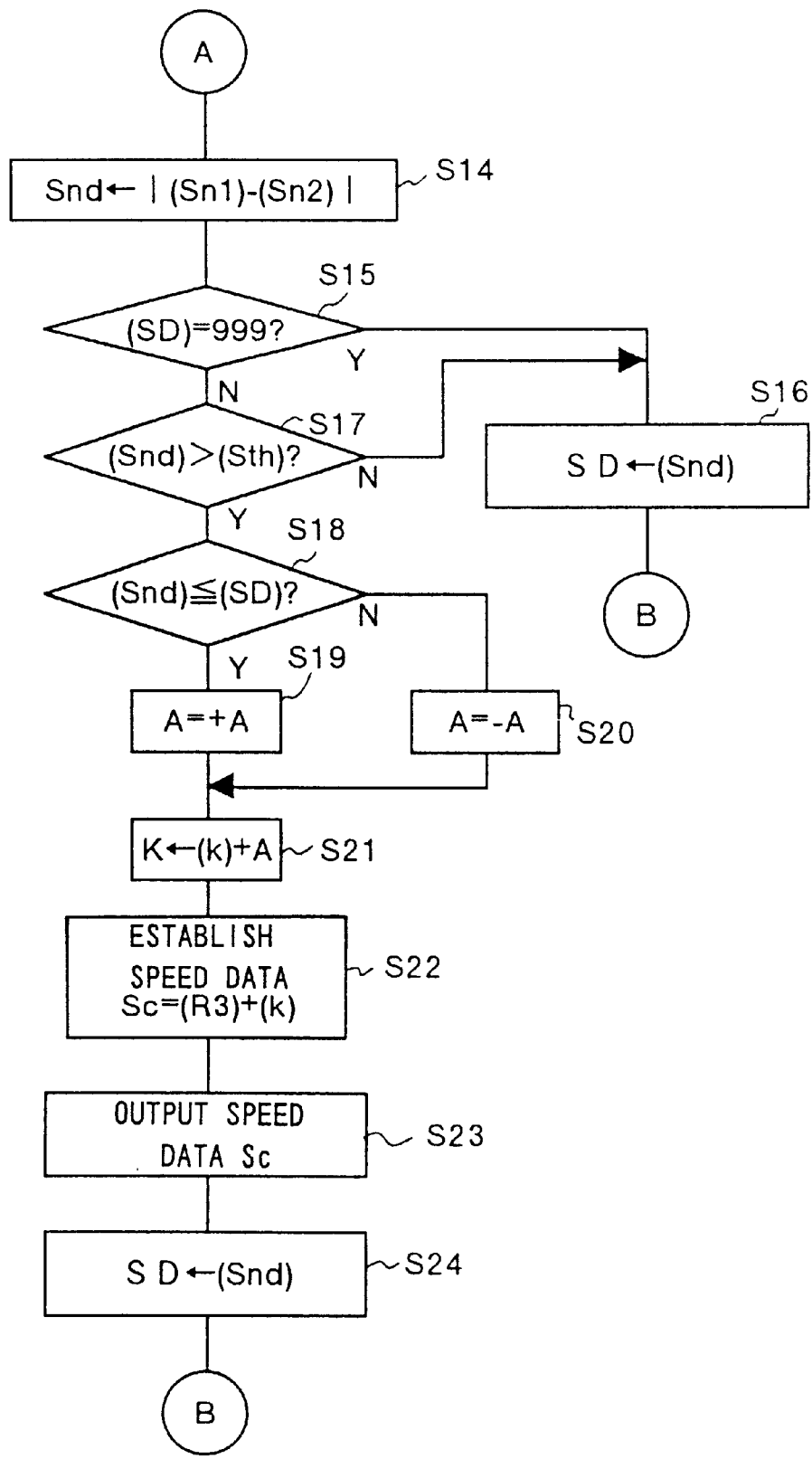
Figure 20:
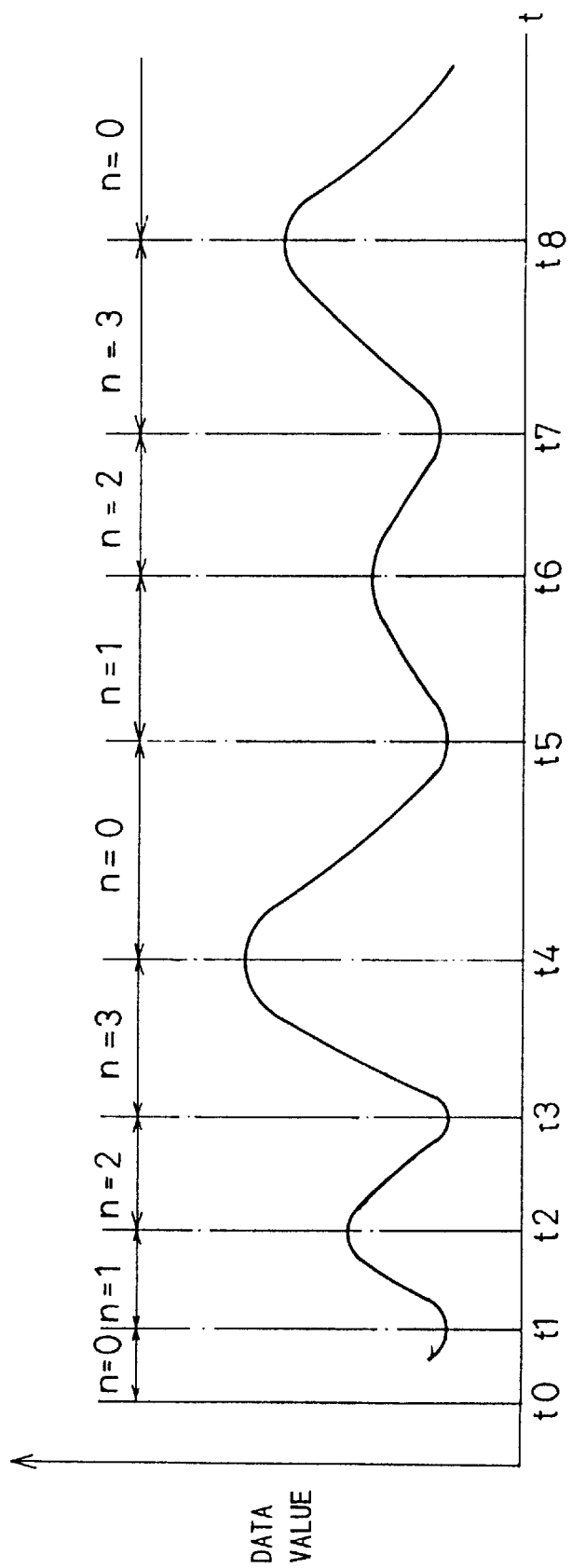
FIG. 20 is a timing chart showing how a transition attribute value varies as detected data varies.

Thereafter, control goes through the step S14 to the step S15 (see FIG. 19). Inasmuch as the value stored in the register SD is not an initial value but a preceding differential value (the absolute value of the difference between the first maximum value at the time t2 and the second maximum value at the time t4), control proceeds from the step S15 to a step S17. In the step S17, the correction process decision means 118 determines whether the correction process needs to be presently carried out or not by determining whether the value (present differential value) stored in the register Snd is greater than the data (threshold value) stored in the register Sth. The threshold value is preset according to given specifications and stored in a predetermined storage area in a data ROM (not shown). When the rate increasing and reducing speed correcting program is started, the threshold value is read from the data ROM and stored in the register Sth.

If the present differential value is greater than the threshold value, indicating that the correction process needs to be executed, then control proceeds to a step S18 in which the corrective direction decision means 120 determines whether the rate of $NH_3$ to be introduced into the exhaust passage 66 is to be increased or reduced on the basis of the value (present differential value) stored in the register Snd and the data (preceding differential value) stored in the register SD. If the present differential value is equal to or smaller than the preceding differential value, then it is determined that the rate of $NH_3$ to be introduced into the exhaust passage 66 is to be increased, and control goes to a step S19 in which the corrective direction attribute A is defined as "+A". The corrective direction attribute A may be of any of various real numbers. According to the third embodiment, the corrective direction attribute A is selected to be "1". If present differential value is greater than the preceding differential value, then control goes to a step S20 in which the corrective direction attribute A is defined as "−A".

In a next step S21, the corrective quantity establishing means 124 updates a corrective quantity based on the present corrective direction attribute A. Specifically, the corrective quantity establishing means 124 adds the value (corrective quantity) in the register K and the present corrective direction attribute A, and stores the sum in the register K. The initial value stored in the register K is "0".

In a step 522, the speed data establishing means 126 generates present speed data Sc based on the value (corrective quantity) in the register K. Specifically, the speed data establishing means 126 adds the value. (basic speed value) in the third register R3 and the value (corrective quantity) in the register K, and generates the present speed data Sc as the sum.

Like the threshold value, the basic speed value is preset according to given specifications and stored in a predetermined storage area in the data ROM. When the rate increasing and reducing speed correcting program is started, the threshold value is read from the data ROM and stored in the third register R3.

In a next step S23, the speed data output means 128 outputs the present speed data Sc to the rate adjuster 82 (see FIG. 5). Based on the speed data Sc supplied from the control unit 86, the rate adjuster 82 adjusts the time in which the solenoid-operated value is opened or closed.

In a step S24, the maximum difference updating means 130 stores the value (present differential value) in the register Snd as the preceding differential value in the register SD. Thereafter, control returns to the step S2 to carry out a process of detecting a next maximum difference.

The rate increasing and reducing speed correcting program is finished under the control of an OS (operating system) based on an external program ending interrupt such as a power supply turn-off.

The rate increasing and reducing speed correcting means has been described above with respect to the process of correcting the speeds at which the rates of $NH_3$ are increased and reduced in the NOx removal system according to the third embodiment. However, the rate increasing and reducing speed correcting means may be arranged to carry out a process of correcting rate increasing jumps and rate reducing jumps together with the process of correcting the speeds at which the rates of $NH_3$ are increased and reduced.

The NOx removal system according to the third embodiment is more effective to minimize the discharge of both $NH_3$ and NOx than the NOx removal systems according to the first and second embodiments.

For controlling the rate at which $NH_3$ is to be introduced into the exhaust pipe in the NOx removal systems according to the first, second, and third embodiments, a flow rate signal representative of flow rates of NOx and $NH_3$ may be employed instead of the detected signal Si (representative of concentration information of NOx and $NH_3$) of the NOx sensor 70.

Figure 21:
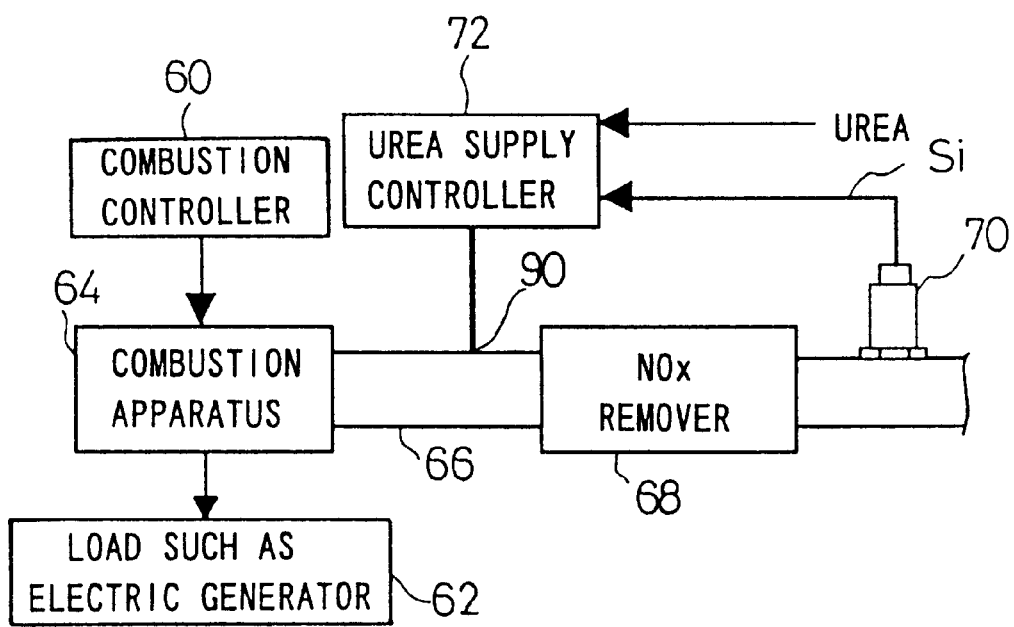
FIG. 21 is a block diagram of the NOx removal system according to another embodiment of the present invention.
Figure 23:
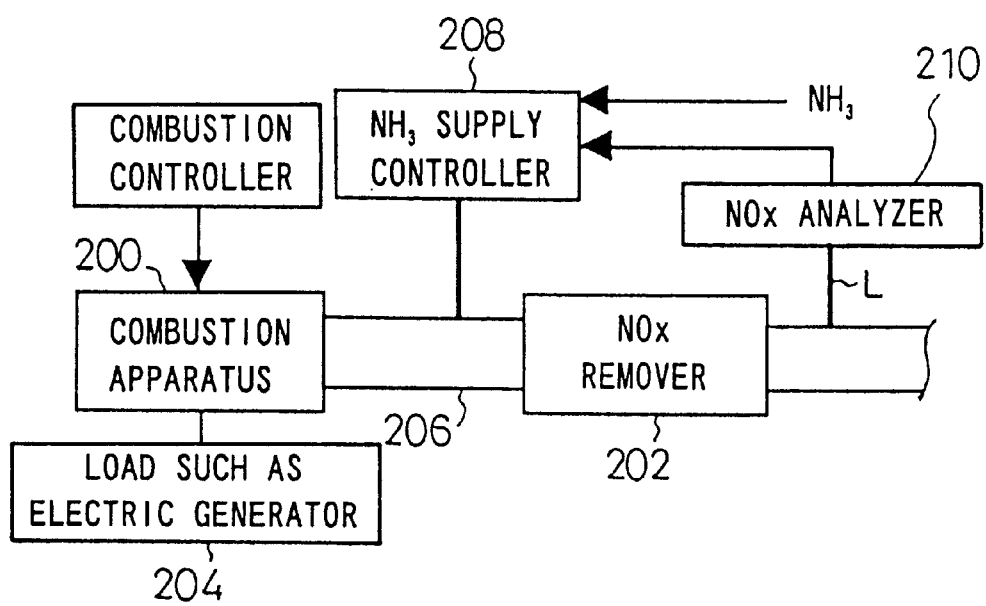
FIG. 23 is a block diagram of a conventional NOx removal system.

In the NOx removal systems according to the first, second, and third embodiments, $NH_3$ has been described as being introduced into the exhaust pipe. However, as shown in FIG. 21 and FIG. 22, urea may be introduced together with or instead of $NH_3$ into the exhaust pipe.

Although certain preferred embodiments of the present invention has been shown and described in detail, it should be understood that various changes and modifications may be made therein without departing from the scope of the appended claims.

What is claimed is:

1. A method of removing $NO_x$ by reacting $NO_x$ contained in a gas emitted from a combustion apparatus, with $NH_3$ to produce $N_2$ and $H_2O$, comprising the steps of:

introducing $NH_3$ and/or urea into the gas emitted from the combustion apparatus before NOx is removed from said gas;

measuring with a sensor the concentration of $NH_3$ and $NO_x$ in the gas after $NO_x$ is removed therefrom; and controlling a rate at which $NH_3$ and/or urea is introduced into said gas while repeatedly increasing and reducing said rate about a rate of introduction which is a reference value plus the average of increased and reduced rates, in response to a detected signal generated by said sensor, said increasing and reducing the rate at which $NH_3$ and/or urea is introduced results in peak values of $NH_3$ and/or urea and NOx and the speeds of increasing and reducing the rate of $NH_3$ and/or urea being introduced are controlled to minimize the peak values.

2. A method according to claim 1, wherein said sensor comprises an oxygen pump of an oxygen ion conductive solid electrolytic material for reducing the concentration of oxygen in the gas to a level not to decompose NO, an $NO_x$ decomposing catalyst for decomposing $NO_x$ from said oxygen pump, and means for measuring the amount of oxygen produced when $NO_x$ is decomposed by said $NO_x$ decomposing catalyst.

3. A method according to claim 1, wherein said sensor comprises an oxygen pump of an oxygen ion conductive solid electrolytic material for reducing the concentration of oxygen in the gas to a level not to decompose NO, and an $NO_x$-responsive semiconductor for detecting $NO_x$ from said oxygen pump based on an electric resistance thereof.

4. A method of removing $NO_x$ bar reacting $NO_x$ contained in a gas emitted from a combustion apparatus, with $NH_3$ to produce $N_2$ and $H_2O$, comprising the steps of:

introducing $NH_3$ and/or urea into the gas emitted from the combustion apparatus before $NO_x$ is removed from said gas;

measuring with a sensor the concentration of $NH_3$ and $NO_x$ in the gas after $NH_3$, and/or urea are introduced thereinto; and controlling a rate at which $NH_3$ and/or urea is introduced into said gas while repeatedly increasing and reducing said rate about a rate of introduction which is a reference value plus the average of increased and reduced rates, in response to a detected signal generated by said sensor.

5. A method according to claim 4, wherein an $NO_x$ removing catalyst is combined with said sensor.

6. A method according to claim 4, wherein said sensor comprises an oxygen pump of an oxygen ion conductive solid electrolytic material for reducing the concentration of oxygen in the gas to a level not to decompose NO, an $NO_x$ decomposing catalyst for decomposing $NO_x$ from said oxygen pump, and means for measuring the amount of oxygen produced when $NO_x$ is decomposed by said $NO_x$ decomposing catalyst.

7. A method according to claim 4, wherein said sensor comprises an oxygen pump of an oxygen ion conductive solid electrolytic material for reducing the concentration of oxygen in the gas to a level not to decompose NO, and an $NO_x$-responsive semiconductor for detecting $NO_x$ from said oxygen pump based on an electric resistance thereof.

8. A method of removing $NO_x$ by reacting $NO_x$ contained in a gas emitted from a combustion apparatus, with $NH_3$ to produce $N_2$ and $H_2O$, comprising the steps of:

introducing $NH_3$ and/or urea into the gas emitted from the combustion apparatus before $NO_x$ is removed from said gas;

measuring with a first sensor the concentration of $NH_3$ and $NO_x$ in the gas after $NH_3$ and/or urea are introduced thereinto;

measuring with a second sensor the concentration of $NH_3$ and $NO_x$ in the gas after $NO_x$ is removed therefrom; and controlling a rate at which $NH_3$ and/or urea is introduced into said gas while repeatedly increasing and reducing said rate about a rate of introduction which is a reference value plus the average of increased and reduced rates, in response to a detected signal generated by said first NOx sensor, and correcting the controlled rate in response to said detected signal generated by said second $NO_x$ sensor, said increasing and reducing the rate at which $NH_3$ and/or urea is introduced results in peak values of $NH_3$ and/or urea and $NO_x$ and the speeds of increasing and reducing the rate of $NH_3$ and/or urea being introduced are controlled to minimize the peak values.

9. A method according to claim 8, wherein a catalyst for causing a reaction represented by $NH_3=NOx \rightarrow N_2=H_2O$ is combined with at least said first sensor.

10. A method according to claim 8, wherein each of said first and second sensors comprises an oxygen pump of an oxygen ion conductive solid electrolytic material for reducing the concentration of oxygen in the gas to a level not to decompose NO, an $NO_x$ decomposing catalyst for decomposing $NO_x$ from said oxygen pump, and means for measuring the amount of oxygen produced when $NO_x$ is decomposed by said $NO_x$ decomposing catalyst.

11. A method according to claim 8, wherein each of said first and second sensors comprises an oxygen pump of an oxygen ion conductive solid electrolytic material for reducing the concentration of oxygen in the gas to a level not to decompose NO, and an $NO_x$-responsive semiconductor for detecting $NO_x$ from said oxygen pump based on an electric resistance thereof.

* * * * *